United States Patent
Fitzgerald et al.

(10) Patent No.: US 12,006,818 B2
(45) Date of Patent: Jun. 11, 2024

(54) DOWNHOLE DISPLAY

(71) Applicant: MOTIVE DRILLING TECHNOLOGIES, INC., Dallas, TX (US)

(72) Inventors: Ann Kamel Fitzgerald, Dallas, TX (US); Jason Truman Rice, Plano, TX (US); Jeshurun Micaiah Chisholm, Dallas, TX (US); Richard Kulavik, Frisco, TX (US); Brian Eugene Stokeld, Carrollton, TX (US)

(73) Assignee: MOTIVE DRILLING TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 17/447,629

(22) Filed: Sep. 14, 2021

(65) Prior Publication Data
US 2021/0404327 A1  Dec. 30, 2021

Related U.S. Application Data

(63) Continuation of application No. 16/781,460, filed on Feb. 4, 2020, now Pat. No. 11,162,356.
(Continued)

(51) Int. Cl.
*E21B 7/06* (2006.01)
*E21B 47/002* (2012.01)
(Continued)

(52) U.S. Cl.
CPC ............ *E21B 47/26* (2020.05); *E21B 47/002* (2020.05); *G01V 1/34* (2013.01)

(58) Field of Classification Search
CPC ........ E21B 47/26; E21B 47/002; E21B 41/00; E21B 7/04; G01V 1/34
See application file for complete search history.

(56) References Cited

U.S. PATENT DOCUMENTS

| 5,410,152 A | 4/1995 | Gadeken |
| 6,088,294 A | 7/2000 | Leggett, III et al. |
| (Continued) | | |

FOREIGN PATENT DOCUMENTS

| WO | 2008118735 A1 | 10/2008 |
| WO | 2015060846 A1 | 4/2015 |
| (Continued) | | |

OTHER PUBLICATIONS

Non-Final Office Action, dated Sep. 18, 2020, 10 pages.
(Continued)

*Primary Examiner* — Gims S Philippe
(74) *Attorney, Agent, or Firm* — Kilpatrick Townsend & Stockton LLP

(57) ABSTRACT

Downhole display systems and methods. A display of one or more portions of a well log of a well during drilling may be displayed together with a display of one or more portions of one or more reference well logs, which may be presented as projected onto one or more planes, respectively. The logs may be segmented and correlated, with the segments or correlated portions displayed in different colors. A user may manipulate the display of the logs or log segments to assist in correlating them. The user may also manipulate the display so that the view provided of the wellbore and the projected logs changes in any one or all of three dimensions. In addition, the user may manipulate the display by navigating along the length of the borehole to view the projected logs at any point along the well path.

26 Claims, 14 Drawing Sheets

Related U.S. Application Data

(60) Provisional application No. 62/801,495, filed on Feb. 5, 2019.

(51) Int. Cl.
    *E21B 47/26* (2012.01)
    *G01V 1/34* (2006.01)

(56) References Cited

U.S. PATENT DOCUMENTS

| | | | |
|---|---|---|---|
| 6,142,019 | A | 11/2000 | Venchiarutti et al. |
| 6,237,404 | B1 | 5/2001 | Crary et al. |
| 6,408,953 | B1 | 6/2002 | Goldman et al. |
| 6,424,919 | B1 | 7/2002 | Moran et al. |
| 6,438,495 | B1 | 8/2002 | Chau et al. |
| 6,478,096 | B1 * | 11/2002 | Jones .............. E21B 49/10 166/250.01 |
| 6,549,854 | B1 | 4/2003 | Malinverno et al. |
| 6,817,425 | B2 | 11/2004 | Schultz et al. |
| 6,868,921 | B2 | 3/2005 | Burrows et al. |
| 6,968,909 | B2 | 11/2005 | Aldred et al. |
| 7,003,439 | B2 | 2/2006 | Aldred et al. |
| 7,032,689 | B2 | 4/2006 | Goldman et al. |
| 7,073,582 | B2 | 7/2006 | Connell et al. |
| 7,128,167 | B2 | 10/2006 | Dunlop et al. |
| 7,142,986 | B2 | 11/2006 | Moran |
| 7,165,632 | B2 | 1/2007 | Burrows et al. |
| 7,191,850 | B2 | 3/2007 | Williams |
| 7,302,346 | B2 | 11/2007 | Chang et al. |
| 7,357,196 | B2 | 4/2008 | Goldman et al. |
| 7,359,844 | B2 | 4/2008 | Sung et al. |
| 7,460,957 | B2 | 12/2008 | Prange et al. |
| 7,546,209 | B2 | 6/2009 | Williams |
| 7,555,391 | B2 | 6/2009 | Gleitman |
| 7,606,666 | B2 | 10/2009 | Repin et al. |
| 7,650,241 | B2 | 1/2010 | Jogi et al. |
| 7,684,929 | B2 | 3/2010 | Prange et al. |
| 7,802,634 | B2 | 9/2010 | Boone |
| 7,814,989 | B2 | 10/2010 | Nikolakis-Mouchas et al. |
| 7,823,655 | B2 | 11/2010 | Boone et al. |
| 7,860,593 | B2 | 12/2010 | Boone |
| 7,861,800 | B2 | 1/2011 | Chapman et al. |
| 7,873,476 | B2 | 1/2011 | Thorne |
| 7,874,351 | B2 | 1/2011 | Hampton et al. |
| 7,921,937 | B2 | 4/2011 | Brackin et al. |
| 7,933,166 | B2 | 4/2011 | Goodman |
| 7,938,197 | B2 | 5/2011 | Boone et al. |
| 7,946,361 | B2 | 5/2011 | Gurjar et al. |
| 7,953,586 | B2 | 5/2011 | Chen et al. |
| 7,957,946 | B2 | 6/2011 | Pirovolou |
| 7,962,288 | B2 | 6/2011 | Gleitman |
| 7,999,695 | B2 | 8/2011 | Rodney et al. |
| 8,061,440 | B2 | 11/2011 | Chapman et al. |
| 8,061,444 | B2 | 11/2011 | Mullins et al. |
| 8,210,257 | B2 | 7/2012 | Dusterhoft et al. |
| 8,210,283 | B1 | 7/2012 | Benson et al. |
| 8,218,826 | B2 | 7/2012 | Ciglenec et al. |
| 8,233,667 | B2 | 7/2012 | Helgason et al. |
| 8,274,399 | B2 | 9/2012 | Strachan et al. |
| 8,278,931 | B2 | 10/2012 | Fang et al. |
| 8,360,171 | B2 | 1/2013 | Boone et al. |
| 8,363,101 | B2 | 1/2013 | Gschwendtner et al. |
| 8,376,065 | B2 | 2/2013 | Teodorescu et al. |
| 8,395,661 | B1 | 3/2013 | Olsson et al. |
| 8,407,006 | B2 | 3/2013 | Gleitman |
| 8,442,769 | B2 | 5/2013 | Phillips et al. |
| 8,463,549 | B1 | 6/2013 | Selman et al. |
| 8,463,550 | B1 | 6/2013 | Selman et al. |
| 8,489,375 | B2 | 7/2013 | Omeragic et al. |
| 8,510,081 | B2 | 8/2013 | Boone et al. |
| 8,528,663 | B2 | 9/2013 | Boone |
| 8,547,428 | B1 | 10/2013 | Olsson et al. |
| 8,577,660 | B2 | 11/2013 | Wendt et al. |
| 8,596,385 | B2 | 12/2013 | Benson et al. |
| 8,612,194 | B2 | 12/2013 | Horne et al. |
| 8,614,713 | B1 | 12/2013 | Selman et al. |
| 8,615,363 | B2 | 12/2013 | Aamodt et al. |
| 8,622,128 | B2 | 1/2014 | Hegeman |
| 8,676,558 | B2 | 3/2014 | Pirovolou |
| 8,686,996 | B2 | 4/2014 | Cheung et al. |
| 8,752,648 | B2 | 6/2014 | Goebel et al. |
| 8,768,627 | B2 | 7/2014 | Paulk |
| 8,775,145 | B2 | 7/2014 | Downton |
| 8,794,353 | B2 | 8/2014 | Benson et al. |
| 8,812,236 | B1 | 8/2014 | Freeman et al. |
| 8,818,729 | B1 | 8/2014 | Stokeld et al. |
| 8,818,779 | B2 | 8/2014 | Sadlier et al. |
| 8,873,806 | B2 | 10/2014 | Kiest, Jr. |
| 8,875,806 | B2 | 11/2014 | Williams |
| 8,939,233 | B2 | 1/2015 | Edbury et al. |
| 8,960,326 | B2 | 2/2015 | Williams |
| 8,965,703 | B2 | 2/2015 | Prakash et al. |
| 8,977,501 | B2 | 3/2015 | Benson et al. |
| 8,990,021 | B2 | 3/2015 | Jeffryes |
| 8,996,396 | B2 | 3/2015 | Benson et al. |
| 9,022,140 | B2 | 5/2015 | Marx et al. |
| 9,041,547 | B2 | 5/2015 | Hartmann |
| 9,041,794 | B1 | 5/2015 | Olsson et al. |
| 9,085,958 | B2 | 7/2015 | Laing et al. |
| 9,091,139 | B2 | 7/2015 | Weng et al. |
| 9,091,140 | B1 | 7/2015 | Selman et al. |
| 9,097,096 | B1 | 8/2015 | Selman et al. |
| 9,103,192 | B2 | 8/2015 | Yang |
| 9,103,936 | B2 * | 8/2015 | Calleja ................ G01V 3/38 |
| 9,129,236 | B2 | 9/2015 | Elinas et al. |
| 9,134,255 | B1 | 9/2015 | Olsson et al. |
| 9,157,309 | B1 | 10/2015 | Benson et al. |
| 9,181,791 | B2 | 11/2015 | Dolgin et al. |
| 9,181,792 | B2 | 11/2015 | Pena |
| 9,182,517 | B1 | 11/2015 | Selman et al. |
| 9,223,041 | B2 | 12/2015 | Wendt et al. |
| 9,238,960 | B2 | 1/2016 | Benson et al. |
| 9,239,960 | B2 | 1/2016 | Fukata et al. |
| 9,279,319 | B2 | 3/2016 | Savage |
| 9,297,205 | B2 | 3/2016 | Benson et al. |
| 9,322,261 | B2 | 4/2016 | Selman et al. |
| 9,347,308 | B2 | 5/2016 | Benson et al. |
| 9,349,212 | B2 | 5/2016 | Cheung et al. |
| 9,388,680 | B2 | 7/2016 | Moran |
| 9,404,356 | B2 | 8/2016 | Benson et al. |
| 9,410,877 | B2 | 8/2016 | Maxey et al. |
| 9,424,667 | B2 | 8/2016 | Pena et al. |
| 9,428,961 | B2 | 8/2016 | Benson et al. |
| 9,429,676 | B2 | 8/2016 | Benson et al. |
| 9,441,430 | B2 | 9/2016 | Selman et al. |
| 9,464,492 | B2 | 10/2016 | Austefjord et al. |
| 9,494,030 | B2 | 11/2016 | Benson et al. |
| 9,518,817 | B2 | 12/2016 | Baba et al. |
| 9,528,366 | B2 | 12/2016 | Selman et al. |
| 9,528,372 | B2 | 12/2016 | Selman et al. |
| 9,534,446 | B2 | 1/2017 | Williams |
| 9,556,728 | B2 | 1/2017 | De Reynal, Jr. |
| 9,581,018 | B2 | 2/2017 | Dolgin et al. |
| 9,598,949 | B1 | 3/2017 | Selman et al. |
| 9,599,742 | B1 | 3/2017 | Selman et al. |
| 9,651,468 | B2 | 5/2017 | Rowe et al. |
| 9,664,011 | B2 | 5/2017 | Kruspe et al. |
| 9,677,882 | B2 | 6/2017 | Kiest, Jr. |
| 9,702,240 | B2 | 7/2017 | Bittar et al. |
| 9,706,185 | B2 | 7/2017 | Ellis |
| 9,720,131 | B2 | 8/2017 | Zhuo et al. |
| 9,865,022 | B2 | 1/2018 | Benson et al. |
| 9,869,145 | B2 | 1/2018 | Jones et al. |
| 9,912,918 | B2 | 3/2018 | Samuel |
| 9,915,112 | B2 | 3/2018 | Geehan et al. |
| 10,210,638 | B2 * | 2/2019 | Zhu ................ G06T 7/0004 |
| 10,227,859 | B2 | 3/2019 | Richards et al. |
| 10,328,503 | B2 | 6/2019 | Osawa et al. |
| 10,672,154 | B2 | 6/2020 | Gillen et al. |
| 10,788,602 | B2 | 9/2020 | Song et al. |
| 10,954,782 | B2 | 3/2021 | Wilson et al. |
| 11,162,356 | B2 | 11/2021 | Fitzgerald et al. |
| 2003/0233194 | A1 | 12/2003 | Cook |

(56) References Cited

U.S. PATENT DOCUMENTS

| | | |
|---|---|---|
| 2004/0050153 A1* | 3/2004 | Krueger .................. E21B 49/10 73/152.22 |
| 2005/0015231 A1 | 1/2005 | Edwards et al. |
| 2005/0060096 A1 | 3/2005 | Hutchinson |
| 2006/0074561 A1 | 4/2006 | Xia et al. |
| 2006/0293872 A1 | 12/2006 | Zamora et al. |
| 2008/0314641 A1 | 12/2008 | McClard |
| 2009/0078462 A1 | 3/2009 | Boone et al. |
| 2009/0157367 A1 | 6/2009 | Meyer et al. |
| 2009/0260881 A1 | 10/2009 | Williams |
| 2010/0076740 A1 | 3/2010 | Kuchuk et al. |
| 2010/0185395 A1 | 7/2010 | Pirovolou et al. |
| 2010/0282508 A1 | 11/2010 | Johnston et al. |
| 2011/0031019 A1 | 2/2011 | Williams |
| 2011/0161133 A1 | 6/2011 | Staveley et al. |
| 2011/0191029 A1 | 8/2011 | Jalali et al. |
| 2011/0232967 A1 | 9/2011 | Williams |
| 2012/0111631 A1 | 5/2012 | Williams |
| 2012/0188091 A1* | 7/2012 | Calleja ...................... G01V 3/38 340/854.1 |
| 2012/0191354 A1* | 7/2012 | Caycedo ............... E21B 47/022 702/9 |
| 2012/0292111 A1 | 11/2012 | Williams |
| 2013/0049981 A1 | 2/2013 | Macpherson et al. |
| 2013/0166263 A1 | 6/2013 | Shen et al. |
| 2013/0238306 A1 | 9/2013 | Lagenwalter et al. |
| 2014/0000964 A1 | 1/2014 | Selman et al. |
| 2014/0002617 A1 | 1/2014 | Zhang et al. |
| 2014/0025301 A1 | 1/2014 | Storm et al. |
| 2014/0152659 A1* | 6/2014 | Davidson ................ G06T 17/05 345/420 |
| 2014/0326505 A1 | 11/2014 | Davis et al. |
| 2014/0333754 A1 | 11/2014 | Graves et al. |
| 2014/0379265 A1 | 12/2014 | Beda et al. |
| 2015/0138337 A1 | 5/2015 | Tjhang et al. |
| 2015/0193705 A1 | 7/2015 | Benson et al. |
| 2015/0211352 A1 | 7/2015 | Sugiura |
| 2015/0218914 A1 | 8/2015 | Marx et al. |
| 2015/0218936 A1 | 8/2015 | Maher et al. |
| 2015/0267525 A1 | 9/2015 | May et al. |
| 2015/0330209 A1 | 11/2015 | Panchal et al. |
| 2015/0369031 A1 | 12/2015 | Yang et al. |
| 2015/0377003 A1 | 12/2015 | Benson et al. |
| 2016/0003008 A1 | 1/2016 | Uribe et al. |
| 2016/0024847 A1 | 1/2016 | Benson et al. |
| 2016/0047220 A1 | 2/2016 | Sharp et al. |
| 2016/0076357 A1 | 3/2016 | Hbaieb |
| 2016/0117424 A1 | 4/2016 | Hohl et al. |
| 2016/0124101 A1 | 5/2016 | Spicer et al. |
| 2016/0177699 A1 | 6/2016 | Benson et al. |
| 2016/0186496 A1 | 6/2016 | De Bakker et al. |
| 2016/0251900 A1 | 9/2016 | Benson et al. |
| 2016/0265334 A1 | 9/2016 | Dykstra et al. |
| 2016/0265336 A1 | 9/2016 | Benson et al. |
| 2016/0281489 A1 | 9/2016 | Dykstra et al. |
| 2016/0290117 A1 | 10/2016 | Dykstra et al. |
| 2016/0305230 A1 | 10/2016 | Benson et al. |
| 2016/0327678 A1 | 11/2016 | Benson et al. |
| 2016/0333673 A1 | 11/2016 | Anno et al. |
| 2016/0362971 A1 | 12/2016 | Benson et al. |
| 2016/0370480 A1 | 12/2016 | Shetty et al. |
| 2017/0058656 A1 | 3/2017 | Benson et al. |
| 2017/0073351 A1 | 3/2017 | Chafeev et al. |
| 2017/0081953 A1 | 3/2017 | Benson et al. |
| 2017/0089153 A1 | 3/2017 | Teodorescu |
| 2017/0096887 A1 | 4/2017 | Wilson et al. |
| 2017/0145804 A1 | 5/2017 | Wessling et al. |
| 2017/0152739 A1 | 6/2017 | Benson et al. |
| 2017/0152793 A1 | 6/2017 | Albrecht et al. |
| 2017/0161885 A1 | 6/2017 | Parmeshwar et al. |
| 2017/0167853 A1 | 6/2017 | Zheng et al. |
| 2017/0183952 A1 | 6/2017 | Williams |
| 2017/0277264 A1 | 9/2017 | Grant et al. |
| 2017/0322086 A1 | 11/2017 | Luharuka et al. |
| 2017/0322332 A1 | 11/2017 | Cooper et al. |
| 2018/0003839 A1 | 1/2018 | Lowell et al. |
| 2018/0068037 A1 | 3/2018 | Williams |
| 2018/0073351 A9 | 3/2018 | Benson et al. |
| 2018/0180524 A1 | 6/2018 | Francois et al. |
| 2018/0225778 A1 | 8/2018 | Grant et al. |
| 2019/0102612 A1 | 4/2019 | Takemoto et al. |
| 2019/0136650 A1 | 5/2019 | Zheng et al. |
| 2019/0141294 A1 | 5/2019 | Thorn et al. |
| 2019/0206068 A1 | 7/2019 | Stark et al. |
| 2020/0080409 A1 | 3/2020 | Haggerty et al. |
| 2020/0126386 A1 | 4/2020 | Michalopulos et al. |
| 2020/0157887 A1* | 5/2020 | Alonso ................... E21B 43/30 |
| 2020/0362687 A1 | 11/2020 | Hopwood et al. |
| 2021/0223424 A1 | 7/2021 | Valensi et al. |

FOREIGN PATENT DOCUMENTS

| | | |
|---|---|---|
| WO | 2016147045 A1 | 9/2016 |
| WO | 2017042677 A1 | 3/2017 |
| WO | 2017132297 A2 | 8/2017 |
| WO | 2017142508 A1 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |
| WO | 2019005045 A1 | 1/2019 |

OTHER PUBLICATIONS

Notice of Allowance, dated Jun. 15, 2021, 5 pages.
International Preliminary Report on Patentability, dated Aug. 19, 2021, 8 pages.
International Search Report and Written Opinion, dated Apr. 27, 2020, 9 pages.
EP20752426.5, "Extended European Search Report", dated Jun. 17, 2022, 10 pages.
U.S. Appl. No. 16/781,460, "Corrected Notice of Allowability", dated Oct. 5, 2021, 3 pages.
U.S. Appl. No. 16/780,503, "Advisory Action", dated Jan. 17, 2023, 4 pages.
U.S. Appl. No. 16/780,503, "Final Office Action", dated Oct. 31, 2022, 22 pages.
U.S. Appl. No. 16/780,503, "Non-Final Office Action", dated Apr. 4, 2022, 17 pages.
U.S. Appl. No. 16/780,503, "Non-Final Office Action", dated Apr. 7, 2023, 16 pages.
EP20752242.6, "Extended European Search Report", dated Jun. 21, 2022, 6 pages.
PCT/US2020/016434, "International Preliminary Report on Patentability", dated Aug. 19, 2021, 8 pages.
PCT/US2020/016434, "International Search Report and Written Opinion", dated Apr. 29, 2020, 9 pages.
Wang, et al., "Arc-Length Parameterized Spline Curves for Real-Time Simulation", Curve and Surface Design, 2002, pp. 387-396.
Winkler, "Geosteering by Exact Inference on a Bayesian Network", Geophysics, vol. 82, No. 5, May 2017, 27 pages.
U.S. Appl. No. 16/780,503, "Final Office Action", dated Nov. 13, 2023, 18 pages.
CA3123941, "Office Action", dated Sep. 14, 2023, 4 pages.

* cited by examiner

DOWNHOLE DISPLAY

CROSS-REFERENCES TO RELATED APPLICATIONS

This application is a continuation of U.S. patent application Ser. No. 16/781,460, filed Feb. 4, 2020, entitled DOWNHOLE DISPLAY, which claims the benefit of priority of U.S. Provisional Patent Application No. 62/801,495, filed on Feb. 5, 2019, entitled DOWNHOLE 3D DISPLAY. The specifications of which are all incorporated by reference in their entirety.

FIELD OF THE INVENTION

The present disclosure relates generally to drilling of wells for oil and gas production and, more particularly, to systems and methods for providing a display of well information.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

The determination of the well trajectory from a downhole survey may involve various calculations that depend upon reference values and measured values. However, various internal and external factors may adversely affect the downhole survey and, in turn, the determination of the well trajectory.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
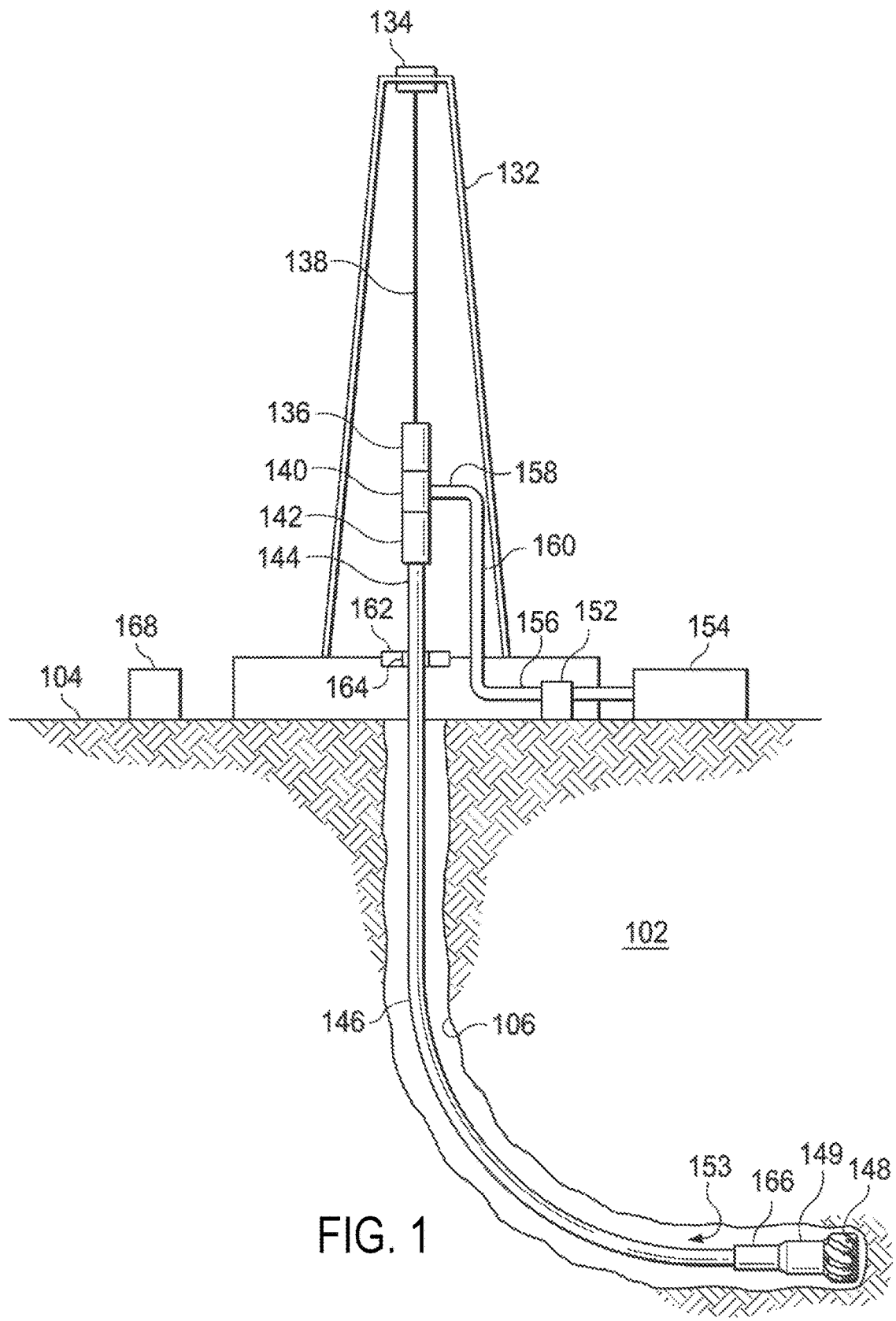
FIG. 1 is a depiction of a drilling system for drilling a borehole.

In the following description, In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drill plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve optimal drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture (e.g., drilling mud 153) from a mud pit 154 into drill string 146. Mud pit 154 is shown schematically as a container, but it is noted that various receptacles, tanks, pits, or other containers may be used. Drilling mud 153 may flow from mud pump 152 into a discharge line 156 that is coupled to a rotary hose 158 by a standpipe 160. Rotary hose 158 may then be coupled to top drive 140, which includes a passage for drilling mud 153 to flow into borehole 106 via drill string 146 from where drilling mud 153 may emerge at drill bit 148. Drilling mud 153 may lubricate drill bit 148 during drilling and, due to the pressure supplied by mud pump 152, drilling mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using certain methods and systems for improved drilling performance.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a drill plan, a regional formation history, drilling engineer parameters, downhole toolface/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the drill plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168.

Figure 2:
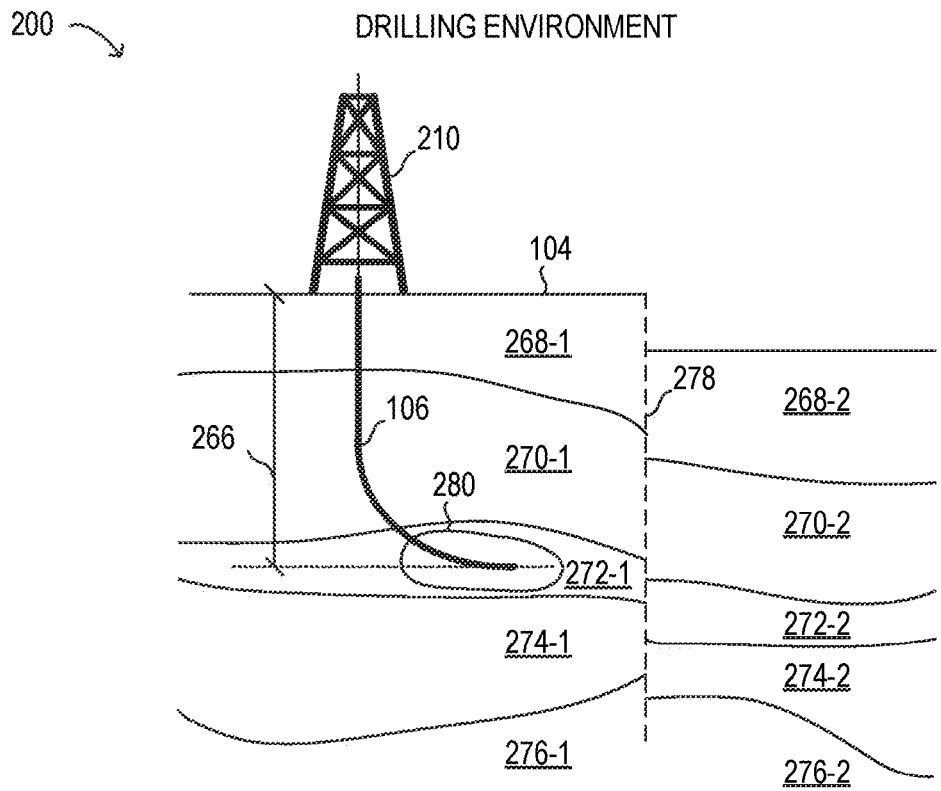
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drill plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drill plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drill plan using subsurface coordinates, or references to certain markers, that indicate where borehole 106 is to be terminated. In other instances, target area may be specified in the drill plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
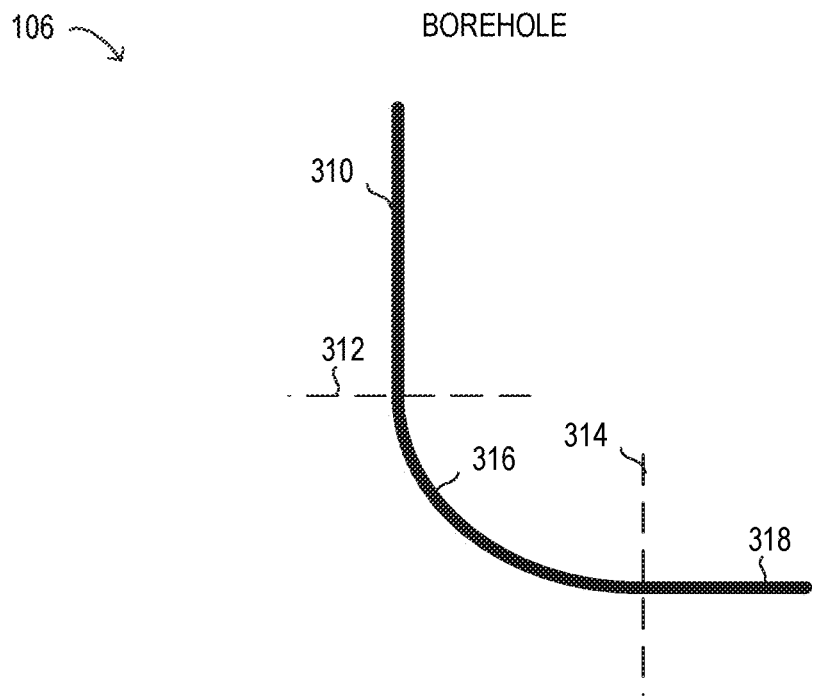
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination in build up section 316 per measured length drilled is referred to herein as a "build rate" and may be defined in degrees per one hundred feet drilled. For example, the build rate may have a value of 6°/100 ft., indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a toolface is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
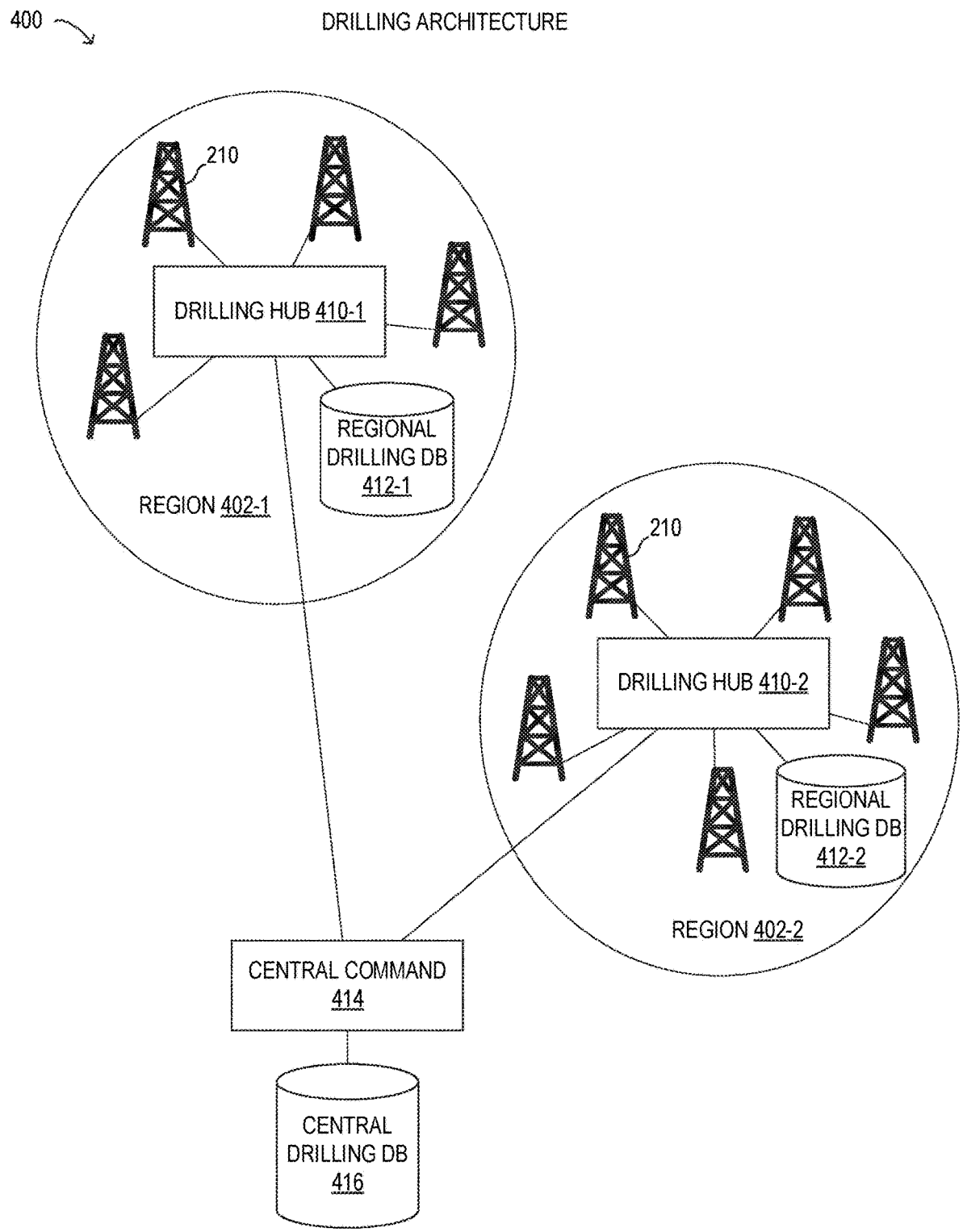
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the drill plan, and may be used for improved drilling performance. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drill plan for drilling rig 210 may include processing and analyzing the collected data in regional drilling DB 412 to create a more effective drill plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
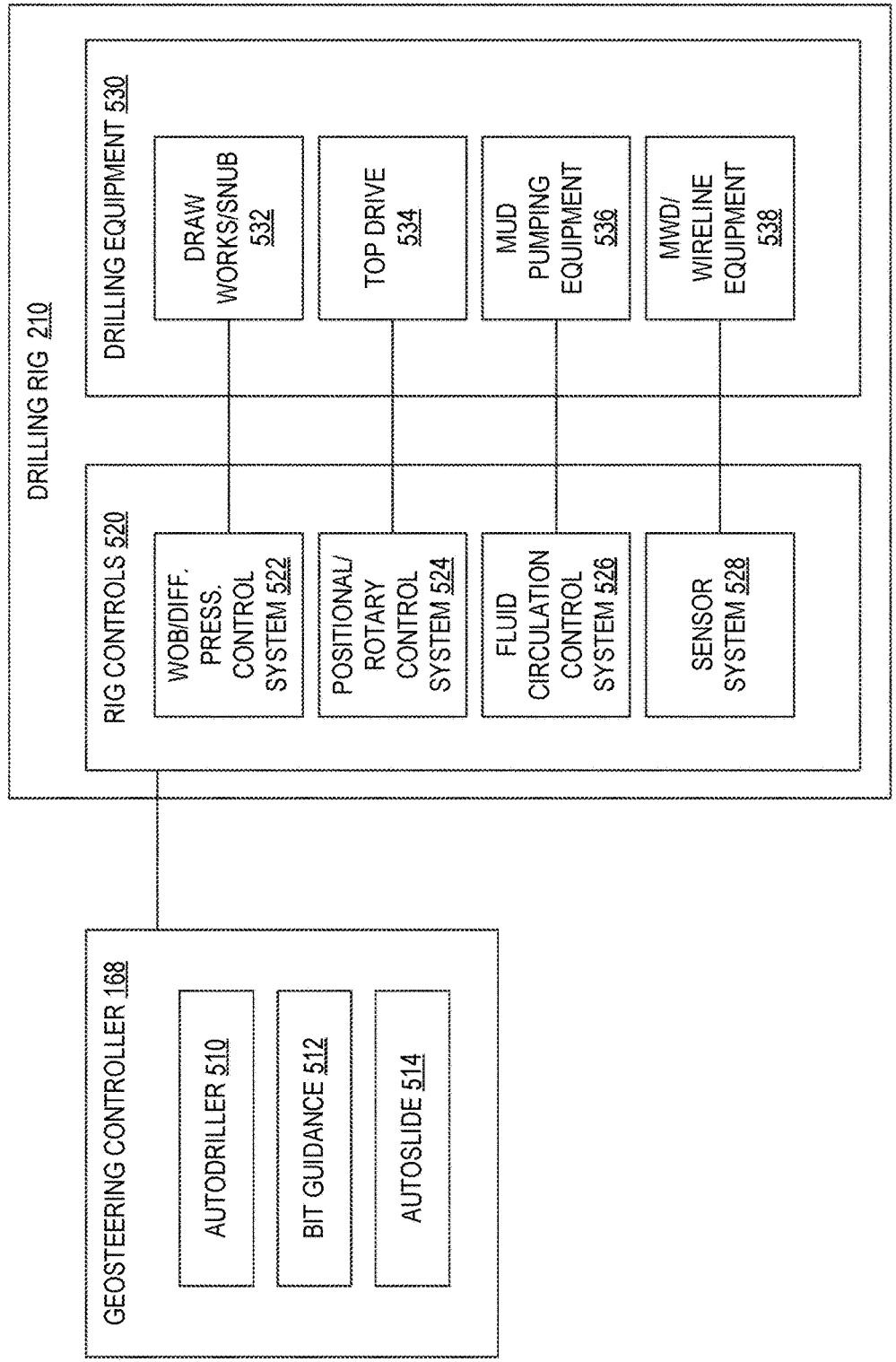
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, mud pumping equipment 536, and MWD/wireline equipment 538.

Figure 10:
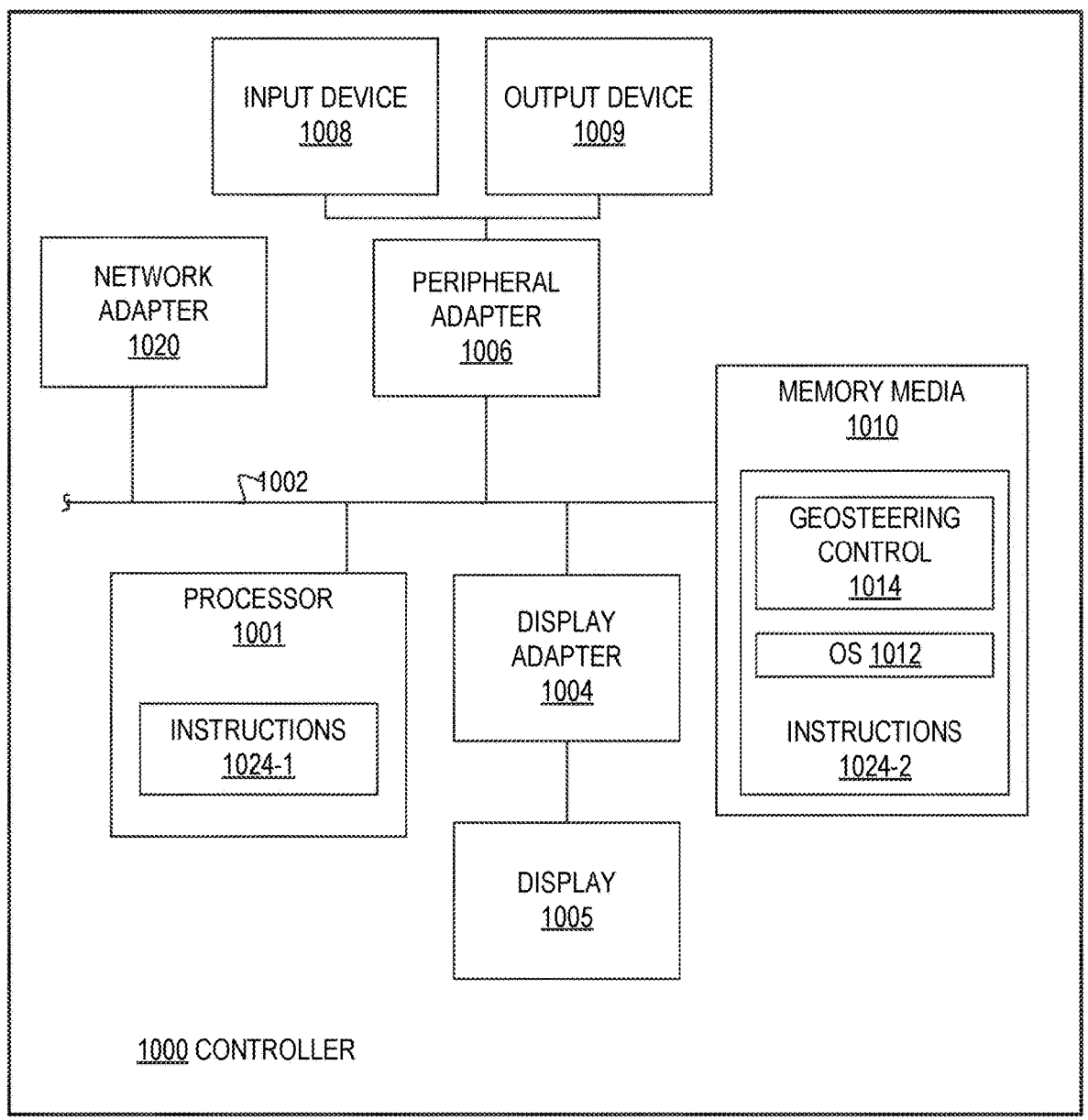
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping equipment 536 to control mud flow and may also receive and decode mud telemetry signals. Sensor system 528 may be interfaced with MWD/wireline equipment 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the drill plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the drill plan. In particular implementations, autoslide 514 may be enabled to provide a user interface during slide drilling to specifically monitor and control the slide. For example, autoslide 514 may rely on bit guidance 512 for orienting a toolface and on autodriller 510 to set WOB or control rotation or vibration of drill string 146.

Figure 6:
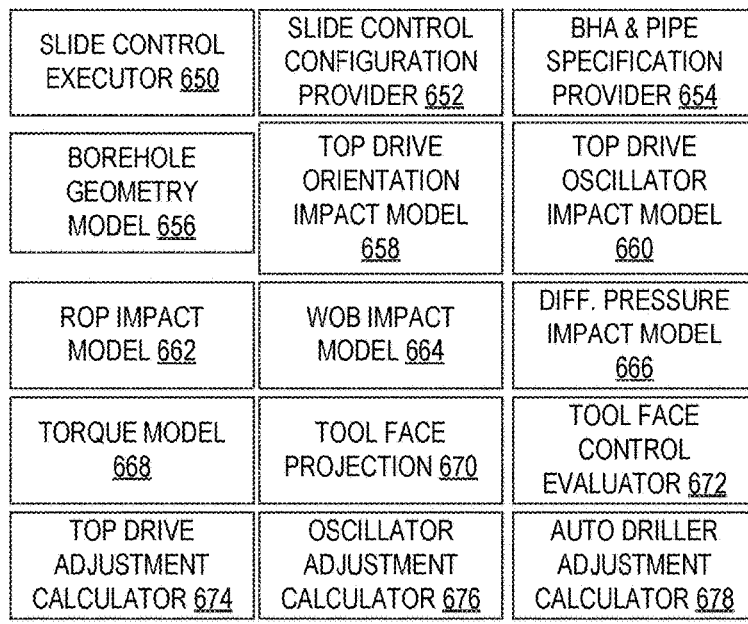
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the toolface control; a top drive oscillator impact model 660 that is responsible for modeling the impact that oscillations of top drive 140 has had on the toolface control; an ROP impact model 662 that is responsible for modeling the effect on the toolface control of a change in ROP or a corresponding ROP set point; a WOB impact model 664 that is responsible for modeling the effect on the toolface control of a change in WOB or a corresponding WOB set point; a differential pressure impact model 666 that is responsible for modeling the effect on the toolface control of a change in differential pressure (DP) or a corresponding DP set point; a torque model 668 that is responsible for modeling the comprehensive representation of torque for surface, downhole, break over, and reactive torque, modeling impact of those torque values on toolface control, and determining torque operational thresholds; a toolface control evaluator 672 that is responsible for evaluating all factors impacting toolface control and whether adjustments need to be projected, determining whether re-alignment off-bottom is indicated, and determining off-bottom toolface operational threshold windows; a toolface projection 670 that is responsible for projecting toolface behavior for top drive 140, the top drive oscillator, and auto driller adjustments; a top drive adjustment calculator 674 that is responsible for calculating top drive adjustments resultant to toolface projections; an oscillator adjustment calculator 676 that is responsible for calculating oscillator adjustments resultant to toolface projections; and an autodriller adjustment calculator 678 that is responsible for calculating adjustments to autodriller 510 resultant to toolface projections.

Figure 7:
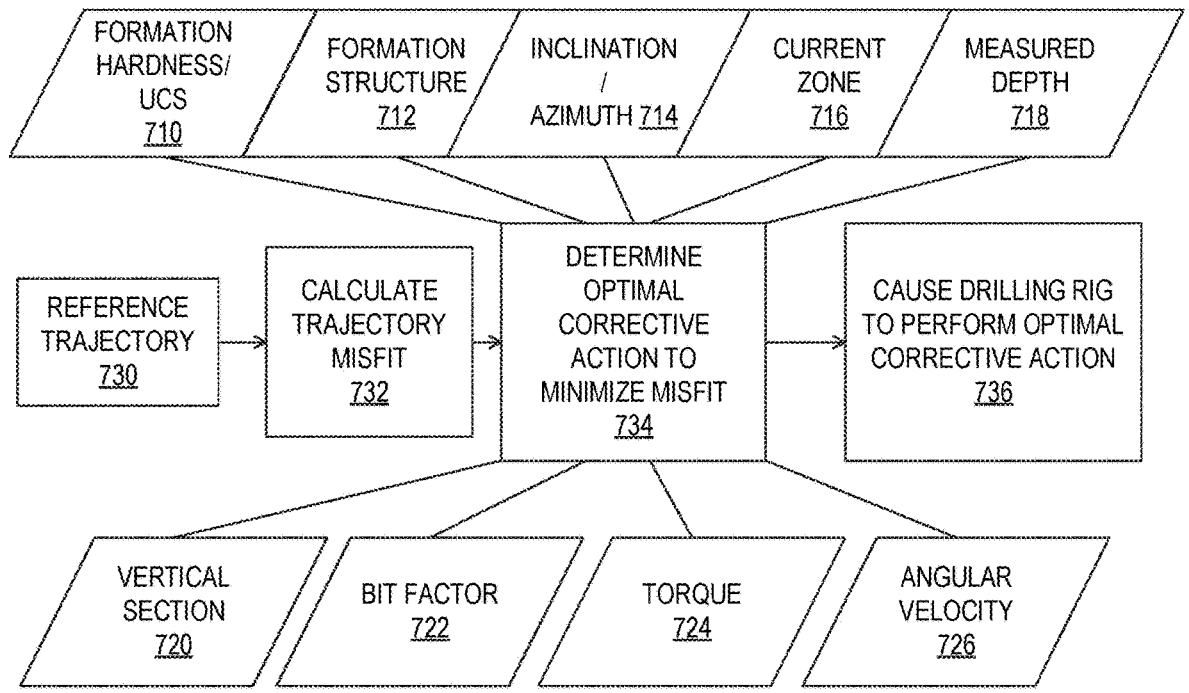
FIG. 7 is a depiction of a steering control process used by the rig control systems.

FIG. 7 illustrates one embodiment of a steering control process 700 for determining an optimal corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired toolface 730, vertical section 720, bit factor 722, mud motor torque 724, reference trajectory 730, and angular velocity 726. In FIG. 7, reference trajectory 730 of borehole 106 is determined to calculate a trajectory misfit in a step 732. Step 732 may output the trajectory misfit to determine an optimal corrective action to minimize the misfit at step 734, which may be performed using the other inputs described above. Then, at step 736, the drilling rig is caused to perform the optimal corrective action.

It is noted that in some implementations, at least certain portions of steering control process 700 may be automated or performed without user intervention, such as using rig control systems 700 (see FIG. 7). In other implementations, the optimal corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
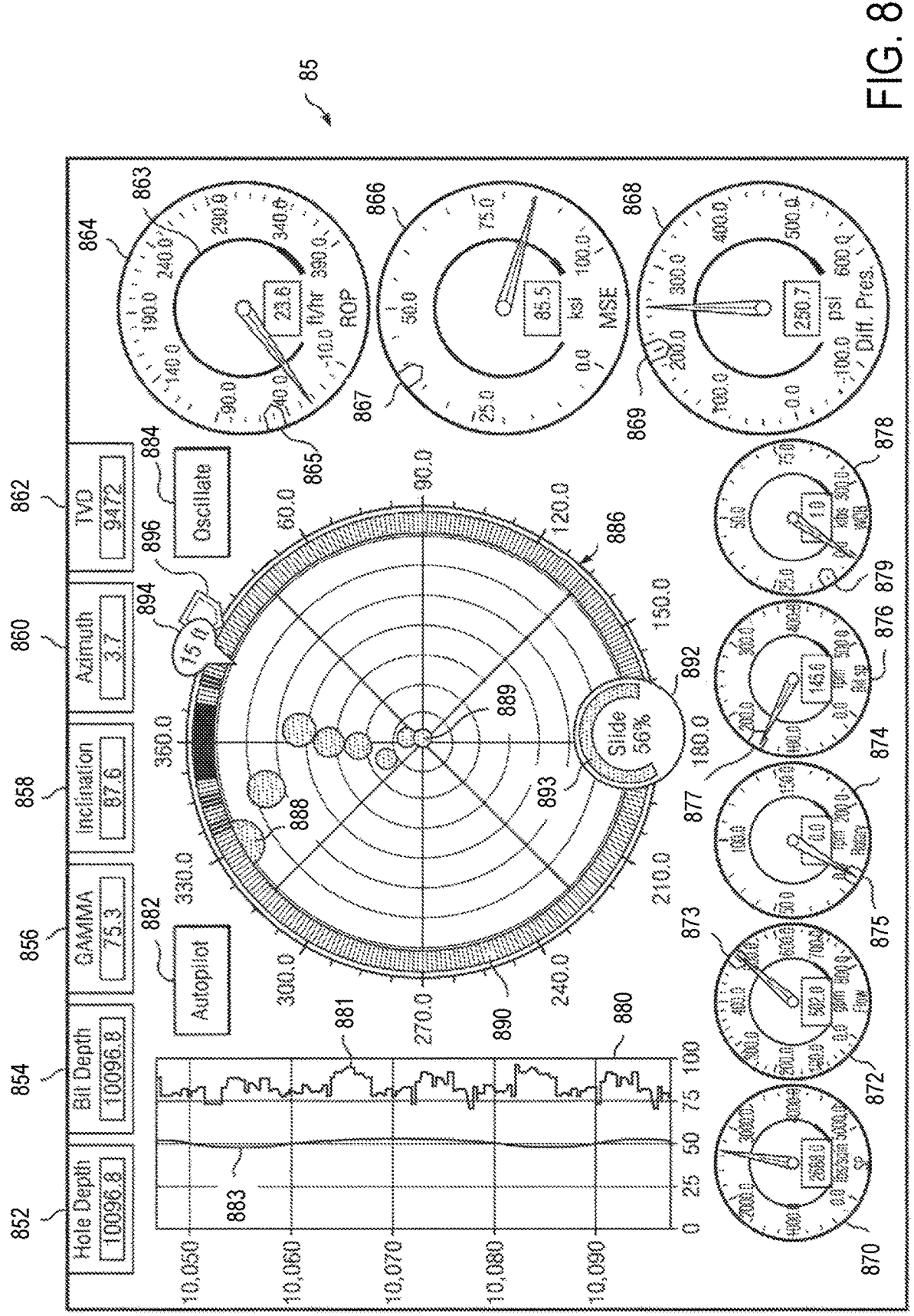
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168. In some embodiments, at least certain portions of user interface 850 may be displayed to and operated by a user of steering control system 168 on a mobile device, such as a tablet or a smartphone (see also FIG. 10). For example, steering control system 168 may support mobile applications that enable user interface 850, or other user interfaces, to be used on the mobile device, for example, within a vicinity of drilling rig 210.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1,380 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical toolface orientation information (e.g., which way the bend is pointed). For purposes of illustration, circular chart 886 represents three hundred and sixty degrees. A series of circles within circular chart 886 may represent a timeline of toolface orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular toolface orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
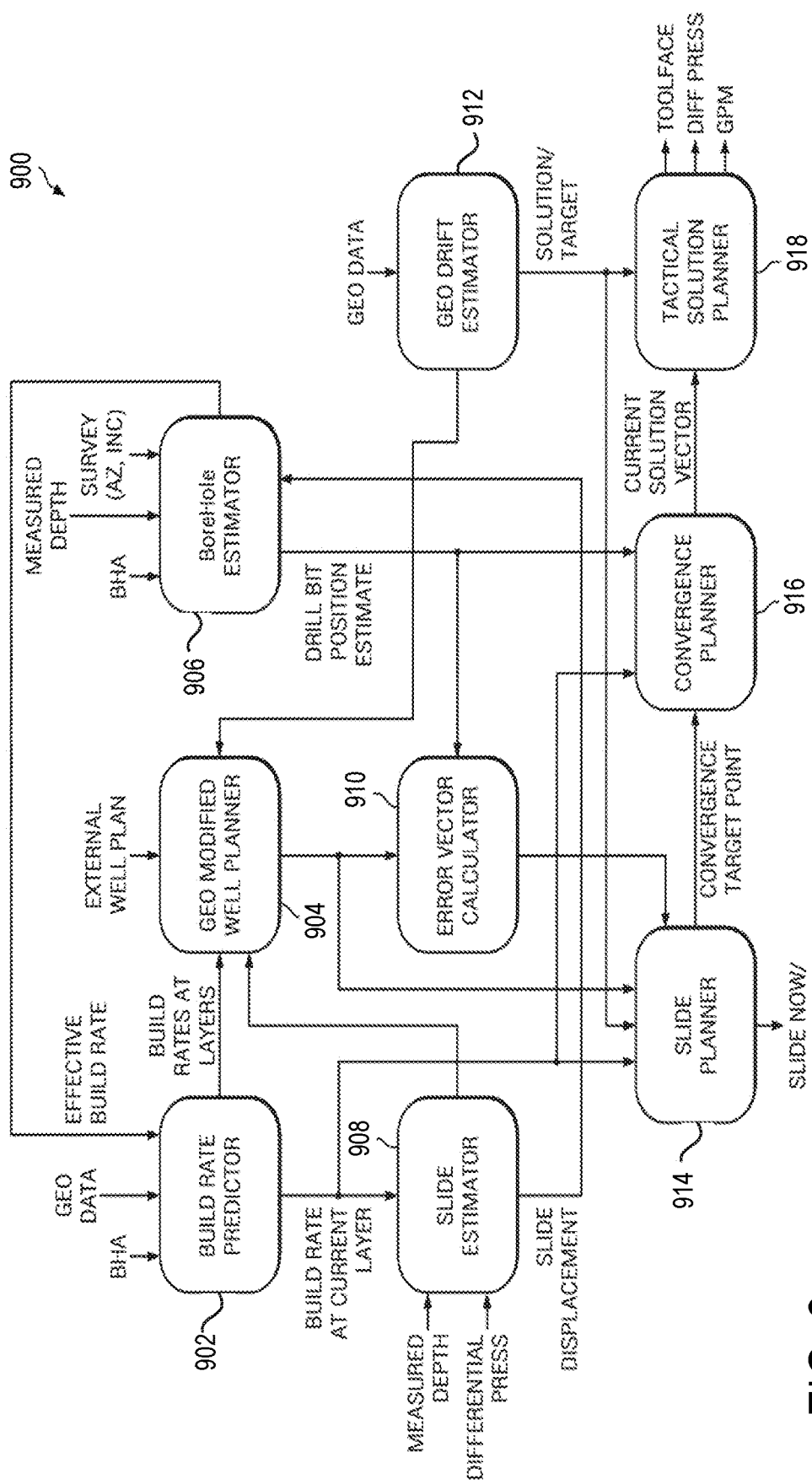
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good toolface and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a drill plan, internal input from build rate predictor 902 and geo drift estimator 912, and provides output to slide planner 914 and error vector calculator 910. Geo modified well planner 904 uses the input to determine whether there is a more optimal trajectory than that provided by the drill plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original drill plan. In some embodiments, geo modified well planner 904 may be an optional module that is not used unless the drill plan is to be modified. For example, if the drill plan is marked in steering control system 168 as non-modifiable, geo modified well planner 904 may be bypassed altogether or geo modified well planner 904 may be configured to pass the drill plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample toolface orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each toolface update may be algorithmically merged with the average differential pressure of the period between the previous and current toolface readings, as well as the MD change during this period to predict the direction, angular deviation, and MD progress during the period. As an example, the periodic rate may be between 10 and 60 seconds per cycle depending on the toolface update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the drill plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost equation and plan for sliding activity, which may include factoring in BHA wear, expected build rates of current and expected formations, and the drill plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the toolface before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes toolface orientation and other parameters. When rotating is started again, drill string 146 starts to wind back up. Slide planner 914 may account for the reactional torque so that toolface references are maintained, rather than stopping rotation and then trying to adjust to an optimal toolface orientation. While not all downhole tools may provide toolface orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and optimal convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as toolface orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole toolface. Accordingly, GCL 900 may receive information corresponding to the rotational position of the drill pipe on the surface. GCL 900 may use this surface positional information to calculate current and desired toolface orientations. These calculations may then be used to define control parameters for adjusting the top drive 140 to accomplish adjustments to the downhole toolface in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active drill plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and toolface (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active drill plan represents the target borehole path and may include an external drill plan and a modified drill plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing steering methods and systems for improved drilling performance according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

As noted previously, steering control system 168 may support the display and operation of various user interfaces, such as in a client/server architecture. For example, steering control 1014 may be enabled to support a web server for providing the user interface to a web browser client, such as on a mobile device or on a personal computer device. In another example, steering control 1014 may be enabled to support an app server for providing the user interface to a client app, such as on a mobile device or on a personal computer device. It is noted that in the web server or the app server architecture, surface steering control 1014 may handle various communications to rig controls 520 while simultaneously supporting the web browser client or the client app with the user interface.

Geosteering

As used herein, "geosteering" refers to an optimal drilling and placement of a borehole of a well (also referred to as a "wellbore"), such as borehole 106, with respect to one or more geological formations. Geosteering can be based on downhole geological and geophysical logging measurements, together with 2D or 3D background geological models, rather than based on following a 3D drill plan in space. The objective of geosteering is usually to keep a directional wellbore within a target zone, which is typically a geological formation or a specific part of a formation. Geosteering may be used to keep a wellbore in a particular section of a reservoir to minimize gas or water breakthrough, and to maximize economic production from the well. In addition, geosteering may be useful to avoid certain formations, such as one in which a drill bit may be more likely to get stuck, or to drill the wellbore so that the drill bit penetrates a formation at a particular angle.

In the process of drilling a borehole, as described previously, geosteering may comprise adjusting the drill plan during drilling to stay in one or more geological target areas. The adjustments to the drill plan in geosteering may be based on geological information measured or logged while drilling and correlation of the measured geological information with a geological model of the formation. The job of the directional driller is then to react to changes in the drill plan provided by geosteering, and to follow the latest drill plan.

A downhole tool used with geosteering will typically have azimuthal and inclination sensors (trajectory stations), along with a gamma ray sensor. Other logging options may include neutron density, resistivity, look-ahead seismic, downhole pressure readings, among others. A large volume of downhole data may be generated, especially by imaging tools, such that the data transmitted during drilling to the surface 104 via mud pulse and electromagnetic telemetry may be a selected fraction of the total generated downhole data. The downhole data that is not transmitted to the surface 104 may be collected in a downhole memory, such as in downhole tool 166, and may be uploaded and decoded once downhole tool 166 is at the surface 104. The uploading of the downhole data at the surface 104 may be transmitted to remote locations from drilling rig 210 (see also FIG. 4).

Downhole Display

As noted previously, a display of various downhole log data and drilling data may be shown to a user of geosteering control system 168 or another computer system. The log data or drilling data shown to the user in the downhole display may be acquired and displayed during drilling without delay, or may be acquired previously and displayed after drilling is complete. The downhole display may be shown in various formats and arrangements, without limitation.

In one particular embodiment, a downhole display may be generated that allows the user to graphically navigate along subterranean borehole 106. As the user navigates borehole 106, the log data or drilling data may be shown in the downhole display as plots versus MD along the actual path of borehole 106. In some embodiments, such a downhole display of log data and drilling data, such as may be provided by geosteering control system 168, may be manipulated by a user providing input commands through various types of user input devices, such as a touch screen, a mouse, a joystick, a foot pedal, or a video game controller, in different embodiments. In addition, the downhole display may be manipulated by two or more users simultaneously, such as by the use of two or more user input devices (e., game controllers) at the same time. The downhole display system described herein may be included or incorporated into the steering control system 168 or controller 1000 as are described above, or may be a separate computer system like controller 1000. The downhole display system may be coupled to a local or remote database, or both, and may allow for displaying relevant information locally at a drill site or a remote location, or both.

In certain embodiments, the user input device may be any one or more of commercially available game controllers, such as the Sony Playstation controller, the Nintendo Switch controller, the Wii Remote controller, and the Xbox game controller, which is commercially available from Microsoft Corporation. We believe that a game controller such as this provides a control device that is familiar and intuitive for most users, and therefore easier to use. In addition, we believe that such a game controller as the user input device allows the user to quickly navigate along the borehole and to quickly and easily adjust the view provided by the display in any or all three dimensions. The ability to quickly and easily manipulate the display provided is especially important when the user is viewing a borehole as it is being drilled, as this helps allow the user to make essentially real-time decisions about drilling operations during drilling.

A game controller such as described above may be provided with one or more accelerometers and one or more gyroscopes, as well as one or more vibrating devices. A game controller with these features is advantageous because it allows for the user to manipulate the downhole display by moving the game controller in three dimensions, and in addition the vibrating devices can be used to alert the user when a condition occurs (e.g., the user has navigated to the end of the borehole).

Figure 11:
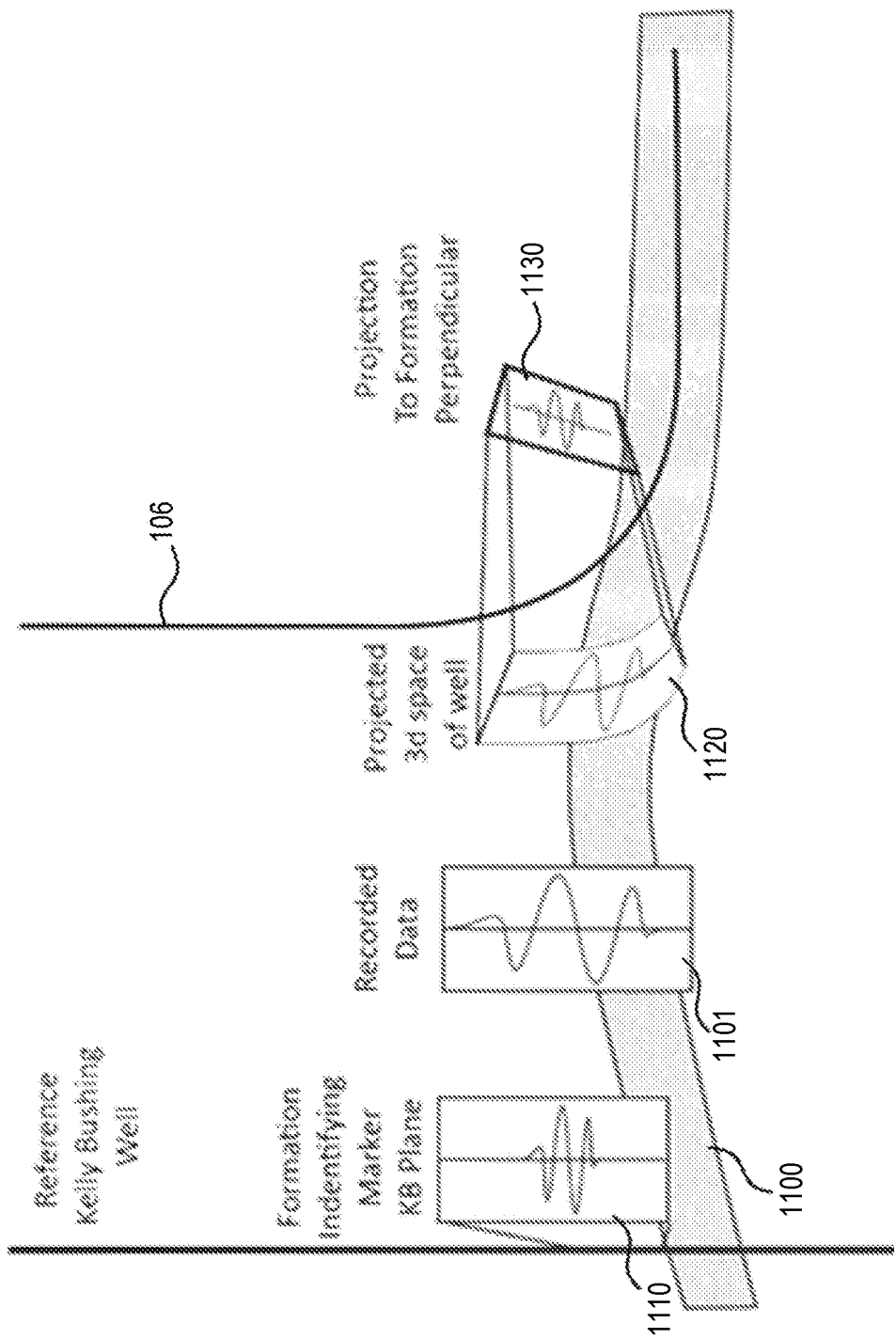
FIG. 11 is a depiction of data mapping for a downhole display.

Referring now to FIG. 11, the projection of downhole data by a downhole display system along a trajectory of borehole 106 in order to generate the downhole display is described. The downhole data may be the log data or drilling data that varies along a position of borehole 106, such as GR logs, MSE logs, magnetic logs, and/or resistivity logs, among others described herein. The downhole data shown in the downhole display may be the same downhole data that is shown to an operator or another user at the surface 104. The data provided to the downhole system in order to generate the downhole display may be accessed from a database, such as central DB database 416, regional drilling DB 412, both, or another database or databases. The database may be used to store downhole reference data, such as one or more reference logs' data from portions of a well that have already been drilled, one or more reference wells, or other sources that act as 'fingerprints' for matching downhole measured data to correlate the location of the wellbore, usually relative to one or more geological formations. It is noted that the same or a different database may be used for the downhole display to record user data, such as previous interpretations of logs or log segments, templates for interpretations, and user input provided during an interpretation, which may be stored by the user as templates and retrieved to perform correlations of well trajectories. The user data may also be used to generate alerts, emails, reports, or other communication that can be auto-generated, for example. In addition, the database used to store such information (e.g., previous log correlations) may also include interpretations from multiple users, who may have differing interpretations of the log information, as well as comments from one or more users on their own or others' interpretations.

Still referring to FIG. 11, a Kelly Bushing (KB) projection plane may be defined as a vertical plane that orients beneath the geological KB point for a drilling rig at a drill site, and has a normal vector that points in a direction along a horizontal well trajectory extending from a vertical section of the well. Accordingly, the downhole data, whether reference data or measured data, may be projected from the KB projection plane into a perpendicular projection plane, such as for horizontal sections of the wellbore trajectory. For example, a movable window projecting from the KB projection plane may be positioned along the downhole data log at any desired position along the path of the wellbore. The movable window may be used as a common frame of reference for both the KB projection plane (or the mapped projection plane) and the logged data, which may represent a projection that can simplify pattern matching, such as recognition of a particular feature in the logged data.

Performing pattern recognition and matching using the downhole display can aid humans in recognizing patterns that are characteristic of formations for detection of individual or specific formations, such as indicated in reference log data. For example, algorithms and machine learning at large may be implemented with the downhole display for correlation, interpretation, kriging (also known as Gaussian process regression), and predictive analytics. In some implementations, the pattern recognition performed in conjunction with the downhole display can be based on human-recognizable patterns that are displayed to the user and matched with an indication provided by the user. In some implementations, the pattern recognition performed in conjunction with the downhole display can be based on downhole data patterns that are automatically detected and correlated, such as with measured survey data. In particular, the pattern recognition may aid in identifying downhole data that indicate specific formation changes, such as GR logs that identify a beginning or an end of a formation along borehole 106. The downhole data, such as GR logs, may enable the display of close stratigraphic layers, signatures, orientations, all along the varied geometry of borehole 106, to enable better understanding by the user, along with improved visualization and interpretation of the downhole data. For example, the downhole display may be used to show and compare alternative projections of downhole data and geological interpretations, such as GR log interpretations from different users. As another example, the downhole display may reduce noise or interference in the displayed log data projections, which may assist in better determining desired or optimal build rates to land the trajectory of borehole 106 into the target area. As noted above, allowing a user to easily and quickly manipulate the data via the downhole display provided by the downhole display system is advantageous because it minimizes the time required and increases the likelihood of a correct correlation of downhole data, thus allowing for faster and better decisions and adjustments in essentially real time during drilling.

As noted, the downhole display may be based on the KB projection plane display 1110 as illustrated in FIG. 11. The KB projection plane display 1110 shown in FIG. 11 includes a segment of a log from the well being drilled. A geological formation 1100 is also shown. The formation 1100 may be a target zone, but need not be. By changing the slope of the KB projection plane 1110, the KB projection plane display 1110 may be mapped into various sections of borehole 106, including horizontal sections. In FIG. 11, a display 1101 of the log data is provided. It should be noted that the amplitude of the log 1101 increases just above the top of the formation 1100, and drops significantly to a minimum value upon reaching the top of the formation 1100. FIG. 11 also provides an exemplary display 1120 of the same log data as in 1110 and 1101 in a projected well space 1120, as well as in a projection 1130 that is perpendicular to the formation 1100. The downhole display system can be programmed to allow a user to use the user input device (as described above) to manipulate the downhole display by switching between different projection modes (such as 1110, 1101, 1120, and 1130), and also by moving along the length of the borehole 106, with the downhole display system programmed to display a projection of the log corresponding the projection mode selected by the user at a position along the log selected by the user. By moving quickly or slowly along the length of the borehole 106, the downhole display presented to the user provides the same segment of log data from the well in varying shapes and sizes, thus allowing the user more easily find patterns that correlate with one another and/or with one or more reference logs.

After mapping the projection plane, noise reduction or noise elimination may be performed by the downhole display system on the downhole data, such as by filtering, smoothing, integrating, etc. In addition, a normalization of the amplitude of the downhole data may also be performed. The X, Y, and Z coordinates (Northing, Easting, and Total Vertical Depth) can be isolated and distorted for each point, plane, thickness, and formation as a whole.

In order to perform correlation of the downhole data, different downhole positions (or indices) along the mapped downhole data log may be selected. Then, at a given downhole position, a section of the downhole data log may be mapped to the KB projection plane for correlation. It is noted that the correlation may also be performed by mapping the downhole data in the KB projection plane to another projection. Such mapping may be done automatically by the downhole display system, by a user using the downhole display system, or an initial mapping may be down automatically by the downhole display system and then presented to a user for approval, modification, or rejection.

After mapping, certain adjustments or distortions, such as stretching or shrinking of the log along the X-axis (downhole position) or the Y-axis (amplitude) or both, may be performed to correlate the downhole data. For example, formation segments of reference downhole data may be distorted (automatically or manually) to match markers, formation tops, and isopach signatures for the wellbore log or for other reference logs. The downhole display system may enable other similar correlations to be used and compared, such as previously performed log segment correlations for the same well, correlations from reference wells, or correlations performed by other users. As the downhole data log is adjusted and distorted during the correlation for automatic interpolation for new matches with isopachs markers, subregions of the plane top and formation slope may be defined to adjust the orientation. As the depth of borehole 106 increases, different downhole reference data, such as from different reference wells, may be used by the downhole display system, such as reference logs that are more pertinent to the formation(s) being drilled through. The downhole reference data may be selected manually by the user or may be automatically selected by the downhole display system based on a numerical confidence rating. When the selected downhole reference data does not correspond to the downhole log data, various downhole data patterns from alternative reference wells may be concatenated together to generate an expected formation log, 3D kriging plane, or to change the drill plan. Existing seismic or terrain models of the formation(s) of interest can help to accentuate the mapping, and may be referenced with the numerical confidence level. Consistent reference log values while drilling may be taken by the downhole display system as an indication that the formation geology and the reference log values are closely related, and may be directly mapped in a particular and homogeneous formation. A collection of wells interpreted may provide a representation of an entire geological region or basin. Data perpendicular to the formation structure may help to determine the geometry of the formation. Fault or dip changes can transfer from the reference data log at the offset of KB, mapped mathematically by the downhole display system to the original KB log, and would initially presume to be the same distance/thickness of formations. The offset points of KB indicators may be continuously interpolated to indicators in the formation using a derived geometry by the downhole display system. The reference data log readings can be inverted on both mirror planes, the KB projection plane, and the formation perpendicular plane, to show juxtaposing formation mapping and the original KB log on the downhole display. Automatic mapping to show where the highs and lows of the formation or formations of interest are can be visually presented for multiple wells across the user interface with a numerical and 3D visualization/interpretation.

With the downhole display system, a user can select an inflection point along borehole 106 shown on the downhole display, to attempt to correlate the reference data log by manipulation with the measured downhole data. As noted, this is typically done for a segment of the wellbore, but the length of the wellbore segment or log segment involved can be automatically selected by the downhole display system (e.g., every ten or twenty feet of measured depth, or every hour of drilling time) or can be manually selected by the user, such as by using a graphic user interface and user input device to select segment starting and ending points for the wellbore or for the log from a display of the wellbore or log, respectively, such as with a mouse click, a touch pad, or an input from a game controller as the user input device. In some implementations, continuous operation of matching and correlation may be selected and performed. As noted, when the user is evaluating particular sections of borehole 106 and the corresponding log information, the user can use the downhole display system to save section segments to analyze at a later time, such as by using the database to save the same. Additionally, the user can use the system to create and add tags on certain segments of the downhole reference logs to save in the database to search later or to include for predictive analytics and machine learning. The user can use the system to also add in daily drilling operations via depth-based information to indicate when drilling occurs and when steering activities may be postponed, or the user may activate automatic notifications or alerts for the same so that others involved in the drilling operations receive such information. The user can also use the downhole display system to orient 3D representations of the wellbore and the log information to match 2D representations.

In order to interpret data shown using the downhole display, the user, such as a geologist, geosteerer, drilling engineer, directional driller, etc., can make decisions for how to position borehole 106 based on reference data such as reference logs and/or make changes to the current drill plan, which may be stored in a database accessible by the downhole display system. The drill plan may be accordingly shifted in bulk or by segments by use of various methods including, but not limited to, trigonometry, based on the interpretation of the log data from the wellbore 106. The downhole display system may suggest drilling parameters and define formation tops via machine learning. In the downhole display system, different offset wells can be weighted to assign a priority for interpretation, while different correlation choices can also be weighted differently when generating interpolations from other correlations or from other weighted numerical confidence levels. In the downhole display system, reference log data projections may be inverted to the KB plane as a check and confirmation.

As noted, the downhole display system may also be enabled to support or perform machine learning algorithms. For example, machine learning may be used to characterize non-homogeneous formation compositions. The data input into machine learning algorithms used for the downhole display may be used to derive a driller's interpretation for log representations, such as in 3D. The reference log data patterns may help to identify stringers, faults, and create warnings for possible drilling-dysfunction encounters, including determining a stop-drilling or slow-down decision or condition, and provide alerts for such conditions and/or automatically implement appropriate corrective action when such conditions are detected, such as by reducing weight on bit, slowing rate of penetration, and/or adjusting other drilling parameters. The machine learning algorithms may generate a projection to the build angle to land a curved section at the desired landing point. In addition, certain drilling parameters may be suggested and formation tops may be defined using the machine learning algorithms.

Using the downhole display system, the user can segment different logs and areas in the well that correspond to a cause-and-effect pattern that can be saved in the database for future identification, or for signaling to change the BHA or its drilling direction (or to adjust other drilling parameters). Automated suggestions for drilling, such as drilling to stay within a target formation, may be provided by the downhole display system. Automated suggestions of predicted ROP, WOB, Differential Pressure, and RPM ranges may be provided with the reference log data while drilling. In some embodiments, the downhole display system may provide such suggestions as control signals to one or more drilling rig control systems or other equipment to automatically adjust drilling parameters in accordance with such suggestions. A suggested overlay plane for any expected drilling hazards may be generated by the system. Time frame predictions of drilling operations of the well being drilled based on information from the offset wells may be provided and displayed on the display. Predictive time stamps on the wellbore display may be marked and displayed by the system as well. The reference well operations time stamp may be shown on the current well trajectory as an informative and competitive indicator. Drilling parameters to mitigate the predictive drilling dysfunctions or names of directional drillers who have overcome recent and similar drilling dysfunctions may also be included in the database and provided on the display by the downhole display system.

The downhole display system allows manipulation of the well log by various adjustments. For example, a user can evaluate the reference log data by using the user input device to change the view of the display by moving along the KB projection plane and distorting the projected reference log data in the formation and orientation back to a desired position, and can do so along any desired portion of the borehole 106 or the entire length of the borehole 106 if desired. Formation layers may be labeled alongside the TVD of borehole 106 in the display. A representation of a steering window for high/low and left/right of the drill plan may be displayed and included with the reference log data and well log data correlation. Each data point of information from a log may effectively improve alignment relative to an axis. A user can add 2D stand-alone reference data logs and interpretations in various data formats (LAS, MS-Excel (Microsoft Corp.), CSV) to the database and the downhole display system can transpose such reference data logs into a 3D format to stretch and fit to a desired downhole data log. A user can use the downhole display system to update the formation layer model around borehole 106 from reference data logs and from inferred automatic and manual log correlations. A user can also use the system to merge datasets of different reference data log offsets to one continuous expected reference data log projection. Auto segmentation for a steering interpretation based on past patterns may be provided by the downhole display system. Different formation segments may be zonally isolated to correlate and interpret, based on inserted completions plans. In this manner, different portions of the well may be managed depending upon the smoothness of borehole 106 for improved drilling, fracking, and/or production performance.

In some embodiments, more than one user may use the downhole display system and relevant database or databases at the same time. For example, multiple users may use the system to interpret and maintain multiple versions of a particular downhole interpretations of data logs simultaneously. Multiple interpretations can be combined or kept separate for cumulative analysis, such that resulting formation models may be independent of single data sources. Multiple users may be active in a single session of the same virtual environment for communication and collaboration. The downhole display system may be used to provide multiple users with one or more interpretations of one or more log segments and allow one or more other users to comment, modify, or adjust the interpretation. The system can also be used by multiple users for analysis and editing of log correlations. Such sharing can be helpful especially because the system allows the multiple users to share particular views of an interpretation or correlation. In some situations, a given view of a correlation of two log segments may be conclusive even when other views of the same two log segments are not clear.

The downhole display system may support kriging of various types of reference log data. Isopachs of reference well(s) reference log data patterns may be projected by the system as a future prediction of the reference log data in non-drilled sections. Patterning of non-homogenous formations such as striation, faults, dips, and homogeneous formations may be duplicated by the downhole display system in an X, Y, Z, size, shape, predicted pattern along borehole 106 and within a region or a basin. Adjustments to 3D data for the location of dips, faults, and other geological characteristics may be performed automatically by the downhole display system.

The downhole display system supports manipulation of various features of the display by a user in some embodiments. An X, Y, Z pattern may be used for adjustments to factor in anomalies, such as for an invariable striation thickness. Unexpected dips and faults may be accounted for by the system by suggesting different kriging interpretations for a number of possible correlations and the best fit can then be selected as the correct correlation. Certain distortions, such as stretching or shrinking a log along the X-axis (downhole position) or the Y-axis (amplitude) or both, may be performed automatically by the system to infer formation structures downhole. Manipulations of the reference well log data may be utilized by the downhole display system to control the toolface orientation to a desired value. Distortion to X, Y, Z coordinates, planes, formations, and basins, may be performed by the user operating a user input device such as a game controller, mouse, or by using a program interface. The distortion may represent the change of percentage, numerical thickness, and may include a suggested automated interpretation.

The downhole display system may provide various interface features that incorporate sensory design aspects including but not limited to visual images, audio, haptic feedback, and temperature changes. Interfaces of different planes can be transparent to show information of but not limited to multiple formation layers and reference well information. Different reference wells can be displayed with different colors for their corresponding data logs shown with the downhole display. Color changes to anti-collision ellipses of uncertainty and/or regions of a target window surrounding the well borehole may be shown in green, yellow, and red. This may be helpful in the case of geosteering to quickly signal on a visual display how well the wellbore is placed in a given location along the wellbore trajectory. In situations in which the wellbore being drilled in located in proximity to other wells, the color shading of the ellipses of uncertainty is helpful to quickly and visually signal to the user via the display if there are narrowing separation factors and to signal the risk of a collision. Color changes to the drilling/geological window can also be used by the system to reflect different circumstances. The user can select different color and pattern display options for, but not limited to, reference log data, Differential Pressure, ROP, WOB, MSE, and RPM, among others. There can be color changes when geological or drilling traces lay on top of one another to form another color using transparent or semitransparent layering. The user can use the system to add alarm features if there is an overlap of reference data log signatures with the reference well in agreement or conflict.

Figure 12:
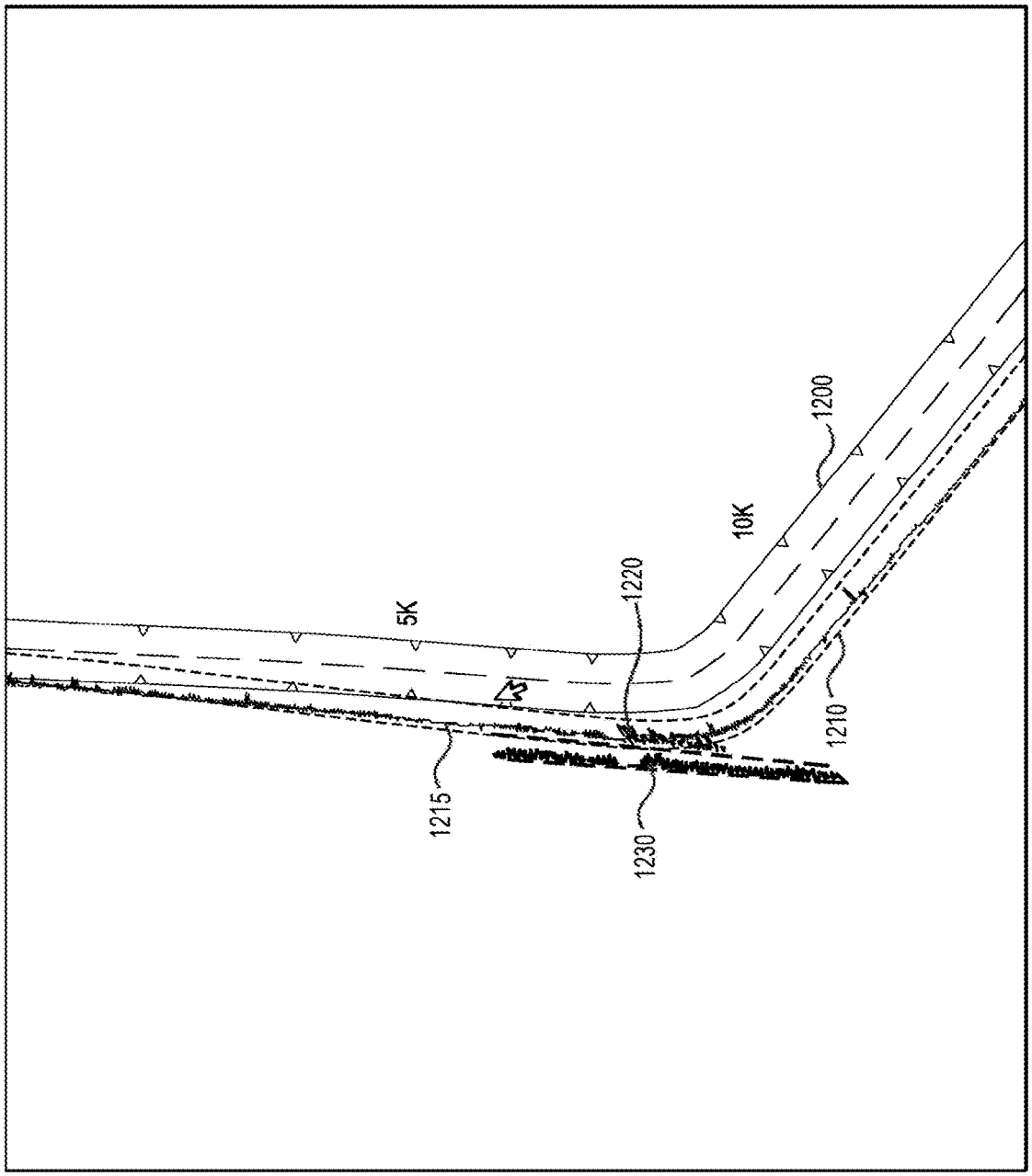
FIGS. 12 to 14 are depictions of a downhole display with gamma ray data.
Figure 13:
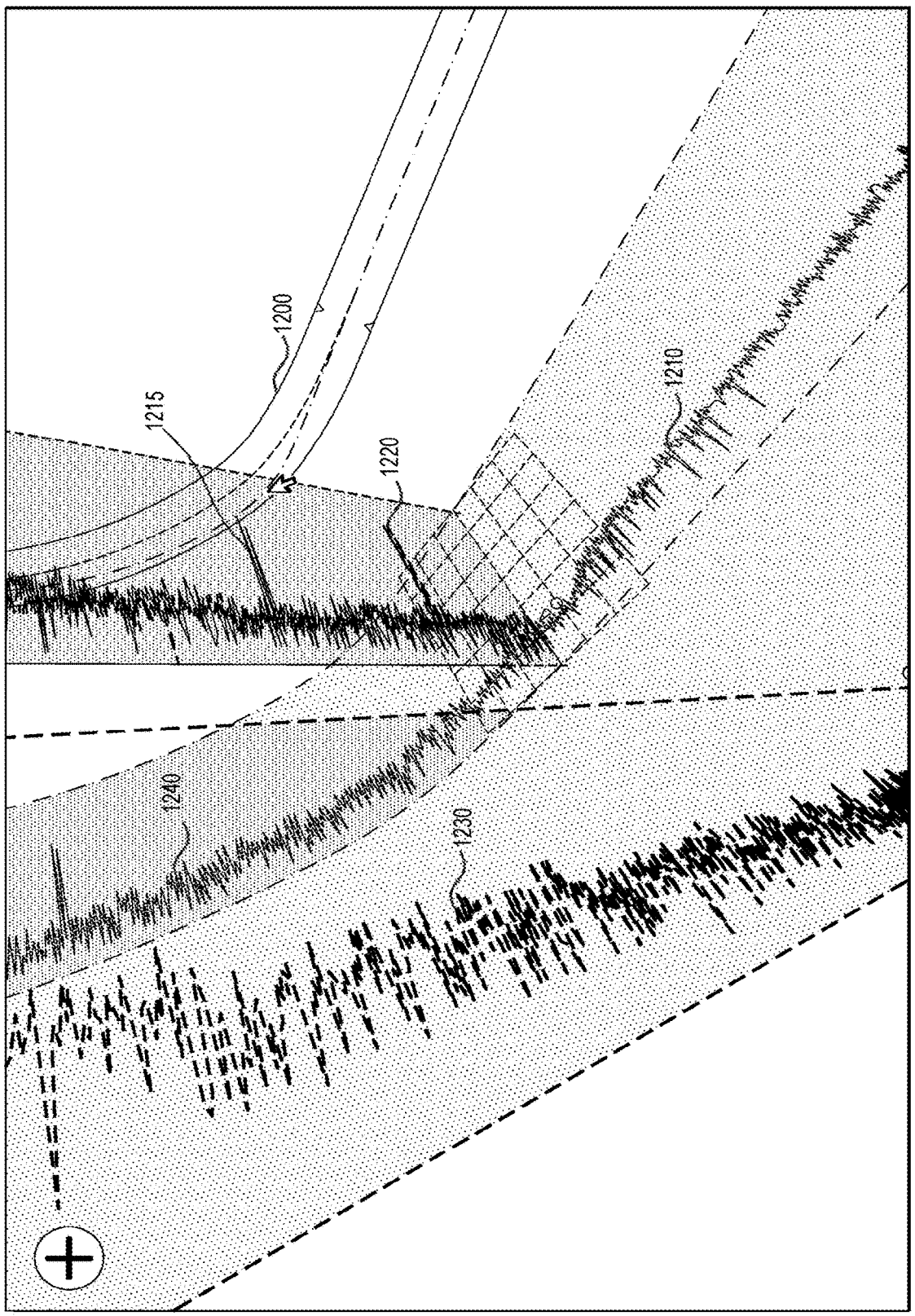
Figure 14:
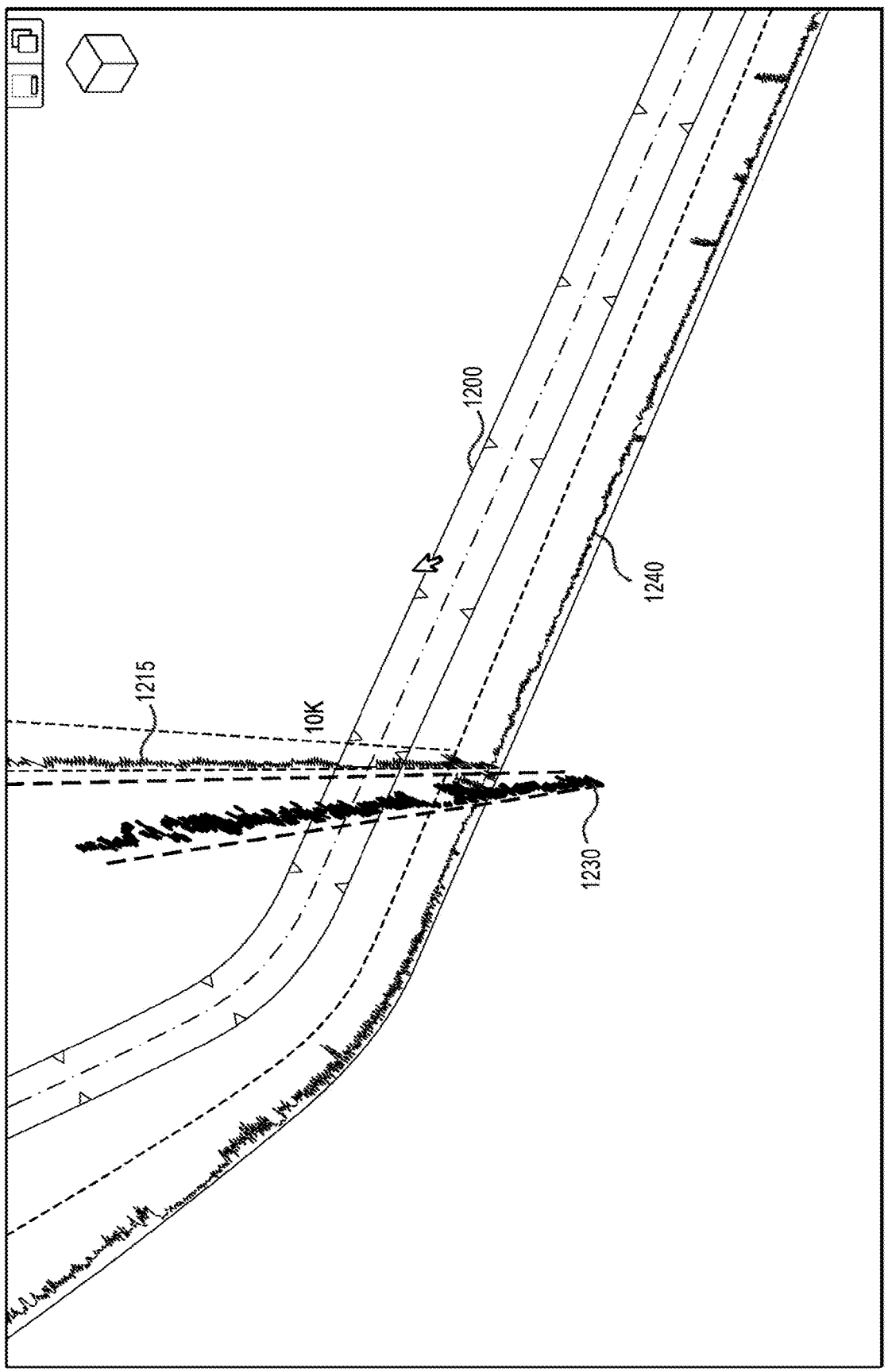

FIGS. 12, 13, and 14 depict an example of the downhole display provided by an embodiment of the downhole display system. Specifically, FIGS. 12, 13, and 14 depict a gamma ray reference log 1210 that is plotted along a wellbore axis 1200. Although a blank background is shown, it is noted that actual formation data may also be depicted in the background. For example, the display could include only a target formation, or it could include a series of formations, and can include identifying information for the formation or formations of interest (e.g., Austin Chalk, Eagleford, etc.) Additionally, measured log data 1215 and 1220 from the wellbore are shown in two different colors, such as green and red. For example, one segment of the measured log data 1215 may be shown in green if it has been previously correlated successfully, with a new or more recent log data segment from measured log data 1215 shown in red to indicate that it still needs to be successfully correlated. In particular, FIGS. 12, 13, and 14 depict a 45° bend in the wellbore 1200 and show how the measured log data 1215 and 1220 and the reference log data 1210 can be displayed for a 45° angle of inclination. For example, either the reference log data 1210 or the measured log data 1215, 1220 can be modified from being plotted against TVD for a vertical well to MD after the 45° bend. In addition, FIG. 12 includes a log 1230. In this example, the log data 1230 illustrates a segment of the measured log as projected onto the Kelly Bushing plane for the well.

Referring now to FIG. 13, additional detail of the downhole display is provided. As illustrated in FIG. 13, portions of log 1215 overlap with portions of log 1220. By providing these two logs in different colors, it is easier to see the portions that have been correlated and the portions that have not, as well as the portions which do not overlap with one another. In FIG. 13, the MD log 1240 for the well as projected along the well trajectory is also illustrated. FIG. 13 also illustrates a portion of the KB projection log 1230 and the target well path 1200. The downhole display system is programmed to allow a user to use the user input device to zoom in on a portion of a wider view display (such as the view shown in FIG. 12) or zoom out from a narrower view (such as shown in FIG. 13). In addition, the user may use the user input device to rotate the view of a given display in any or all three dimensions, thereby allowing the user to manipulate the display presented to obtain whatever view best presents the log data 1230, 1240, 1215, and 1220 to the user. Moreover, the user may use the user input device connected to the downhole display system to adjust the display of the log data as the user navigates along the well path, so that the display presents relevant log data 1215, 1220, 1230, and 1240 for segments corresponding to a given position on the well path 1200 selected by the user. Because the user may move along the well path slowly or quickly as the user may desire, the display will also change and adjust the display of the log segments slowly or quickly, respectively.

In FIG. 14, the MD log 1240 is provided as the reference log alongside the wellbore plot 1200. In addition, the measured wellbore log portions 1215 and 1220 may overlap and may be both shown in a single color (e.g., green) to indicate that they have been correlated in a satisfactory fashion.

Figure 15:
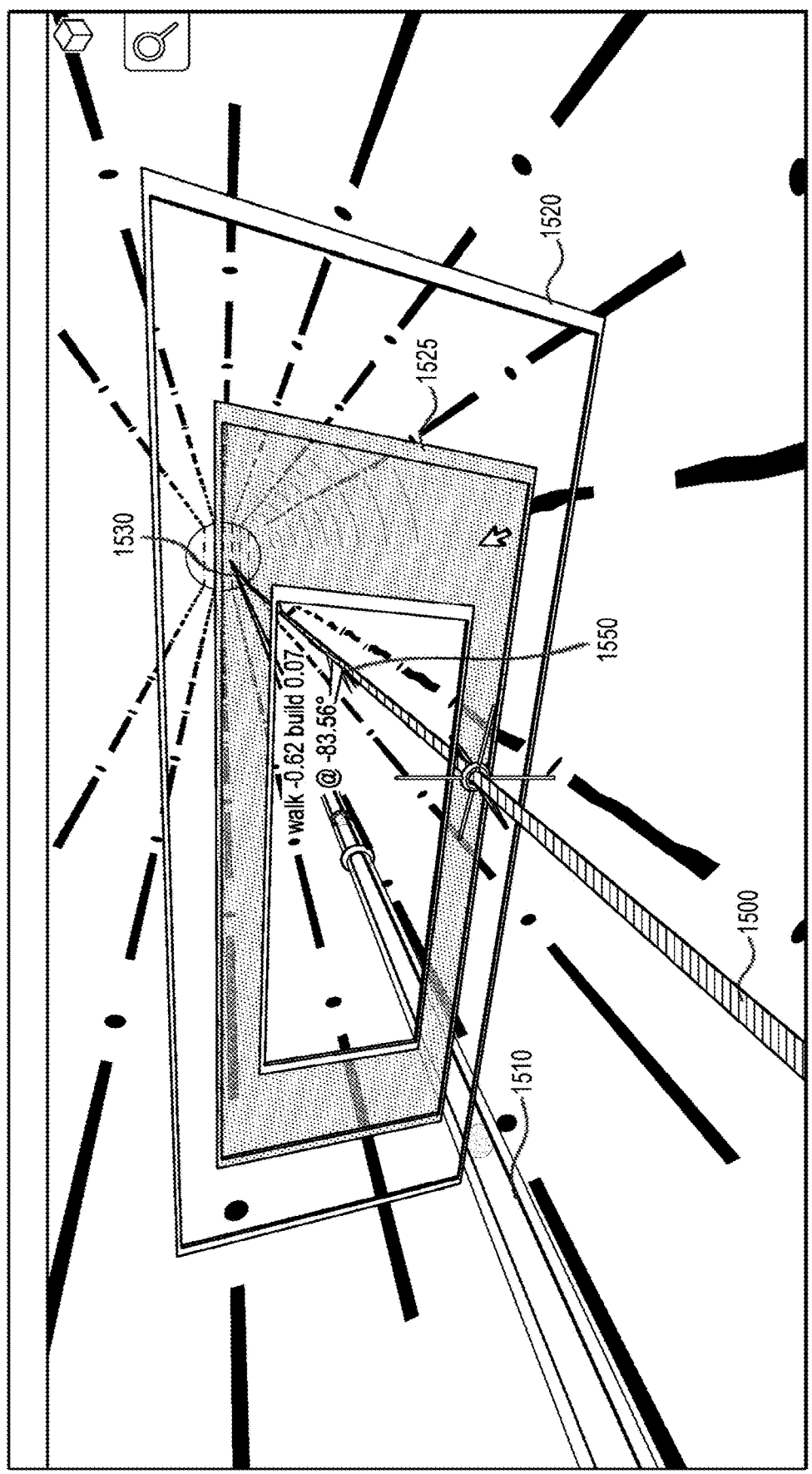
FIGS. 15 and 16 are depictions of a downhole display with geosteering data.
Figure 16:
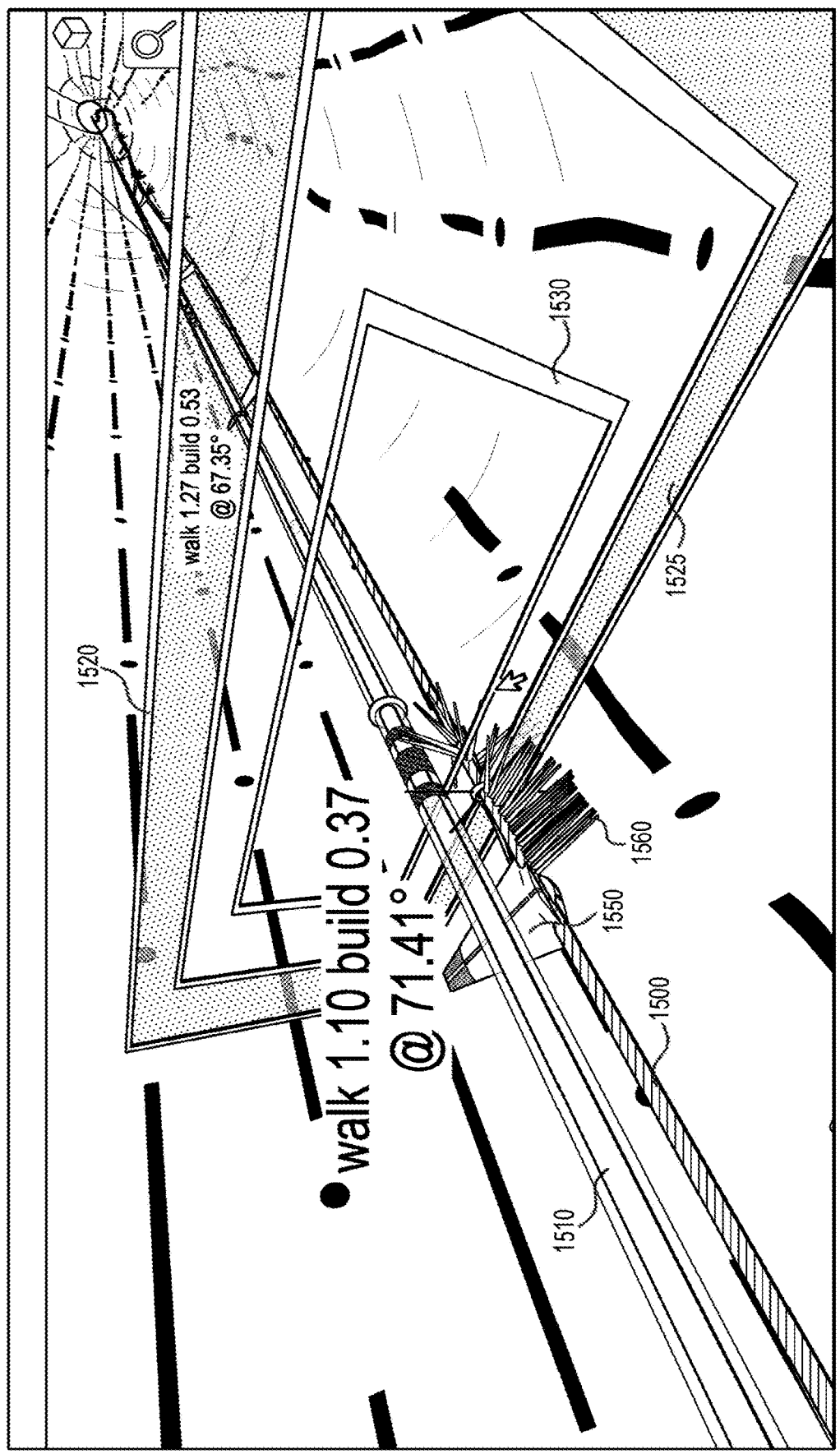

FIGS. 15 and 16 depict an example of the downhole display in another embodiment. Specifically, FIGS. 15 and 16 depict a drilled well borehole trajectory 1500 alongside a planned well trajectory 1510. The well trajectories 1500 and 1510 are depicted in a channel or passageway for viewing clarity. It is noted that other contexts or environments may be used for the background of the well trajectories. The relative distance between the two trajectories 1500 and 1510 can be indicated at a given location using a rectangular display of areas of uncertainty or trajectory error, or with reference to the planned target location. In different embodiments, either the drilled wellbore 1500 or the reference wellbore 1510 may be centered on the rectangular display, such as when the rectangular display regions 1520, 1525, and 1530 represent different zones of acceptable performance for locating the drilled wellbore 1500 relative to the planned or target location 1510. For example, the rectangle 1530 may indicate that the drilled well trajectory 1500 is within an acceptable deviation from the reference well trajectory 1510, and may be colored green on the display to indicate that the location within that rectangle is acceptable. The rectangle 1525 may indicate a higher level of variance from the reference well trajectory 1510 than is desired or may serve as a potential warning that the actual wellbore may be about to exit an acceptable location relative to the planned wellbore 1510. The rectangle 1525 may be colored yellow on the display to so indicate. The outer rectangle 1520 may indicate borderline unacceptable levels of variance from the reference well trajectory 1510, and may be displayed as red to so indicate. It is noted that in some embodiments, ellipsoids of uncertainty rather than rectangles for target locations may be used. It is also noted that, in addition to or instead of different colors, the display could alter the target window or ellipsoids of uncertainty by displaying them in different shapes, sizes, with labels, one or more flashing, different levels of brightness, and so forth.

In FIGS. 15 and 16, additional information is depicted using elements in the display. For example, alongside the drilled well trajectory 1500 at certain intervals a white fin 1550 is shown that indicates an amplitude and direction of a formation drift force that the geological formation exerts on the rotating drill bit. Next to the white fin 1550, several smaller needles 1560 emerging from the drilled well trajectory 1500 indicate toolface values that have been measured. Other values, such as numerical values for toolface or other annotations can also be displayed along the well trajectories.

In the examples provided herein, it should be noted that the displays have been presented in a three-dimensional fashion in the sense that FIGS. 12-16 reflect depth as well as height and width. In addition, the displays as illustrated in FIGS. 12-16 can be manipulated in any or all three dimensions to present varying views that reflect three dimensions. However, it is noted that the downhole display system can be programmed and can use data to provide two-dimensional displays if desired, and also can be programmed and can use data to provide other views if desired, such as are available with virtual reality systems. For example, the display could be provided by the downhole display system to a user using via VR goggles and the user could then virtually navigate the wellbore by various means, such as virtually walking along the wellbore path, virtually manipulating the wellbore with a hand, or by using gestures or motions as input to the system to move the display presented via the VR goggles.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer system for displaying a well trajectory, the computer system comprising:
   a processor;
   a display device coupled to the processor; and
   a memory coupled to the processor, wherein the memory comprises instructions executable by the processor for:
      receiving a first trajectory information associated with a planned wellbore path;
      receiving a second trajectory information associated with an actual path of a wellbore being drilled; and
      responsive to receiving the first trajectory information and the second trajectory information, generating a display on the display device of (i) a first portion of the planned wellbore path, (ii) a first portion of the actual path of the wellbore being drilled, (iii) formation information, and (iv) a plurality of trajectory error regions with each of the plurality of trajectory error regions being associated with a level of trajectory error based on a difference between the actual path of the wellbore being drilled and the planned wellbore path, wherein:
         the plurality of trajectory error regions displayed on the display device comprises a first trajectory error region and a second trajectory error region;
         the first trajectory error region comprises a first level of trajectory error based on a first difference between the actual path of the wellbore being drilled and the planned wellbore path;
         the second trajectory error region comprises a second level of trajectory error based on a second difference between the actual path of the wellbore being drilled and the planned wellbore path; and
         the first level of trajectory error is lower than the second level of trajectory error.

2. The computer system according to claim 1, wherein the formation information comprises at least one of a geological formation, a target formation, identifying information associated with a formation, or formation drift.

3. The computer system according to claim 1, further comprising a user input device coupled to the processor, wherein the user input device comprises a video game controller, wherein the instructions further comprise instructions for:
   responsive to a user input via the video game controller, adjusting the display in any one of three dimensions to provide an adjusted display corresponding to the user input.

4. The computer system according to claim 1, wherein each of the plurality of regions comprises a rectangle or ellipsoid.

5. The computer system according to claim 1, wherein the plurality of regions comprises at least three regions.

6. The computer system according to claim 1, wherein each of the plurality of regions comprises a different color.

7. The computer system according to claim 6, wherein the different color of each region is associated with the level of trajectory error.

8. The computer system according to claim 1, wherein the display comprises a three-dimensional (3D) display.

9. The computer system according to claim 1, wherein a first marker is displayed along the first portion of the actual path of the wellbore being drilled, wherein the first marker indicates an amplitude and direction of a drift force.

10. The computer system according to claim 1, wherein a second marker is displayed along the first portion of the actual path of the wellbore being drilled, wherein the second marker indicates at least one measured tool face value.

11. A computer system for displaying a well trajectory, the computer system comprising:
- a processor; and
- a memory coupled to the processor, wherein the memory comprises instructions executable by the processor for:
  - receiving a first trajectory information associated with a planned wellbore path;
  - receiving a second trajectory information associated with an actual path of a wellbore being drilled;
  - responsive to receiving the first trajectory information and the second trajectory information, generating a display on a display device of aa first portion of the planned wellbore path, ii) a first portion of the actual path of the wellbore being drilled, and (iii) a plurality of regions with each of the plurality of regions being associated with a corresponding area of uncertainty based on a difference between the actual path of the wellbore being drilled, wherein:
    - the plurality of regions displayed on the display device comprise a first region and a second region;
    - the first region comprises a first area of uncertainty;
    - the second region comprises a second area of uncertainty; and
    - the first area of uncertainty is different from than the second area of uncertainty; and
  - responsive to a user input, adjusting the display on the display device.

12. The computer system according to claim 11, wherein the instructions further comprise instructions for:
- responsive to the user input, adjusting the display in any one or more of three dimensions to provide an adjusted display corresponding to the user input.

13. The computer system according to claim 11, wherein each of the plurality of regions comprises a rectangle or ellipsoid.

14. The computer system according to claim 11, wherein the plurality of regions comprises at least three regions.

15. The computer system according to claim 11, wherein each of the plurality of regions comprises a different color.

16. The computer system according to claim 15, wherein the different color of each region is associated with the area of uncertainty.

17. The computer system according to claim 11, wherein the display comprises a three-dimensional (3D) display.

18. The computer system according to claim 11, wherein a first marker is displayed along the first portion of the actual path of the wellbore being drilled, wherein the first marker indicates an amplitude and direction of a drift force.

19. The computer system according to claim 11, wherein a second marker is displayed along the first portion of the actual path of the wellbore being drilled, wherein the second marker indicates at least one measured tool face value.

20. A non-transitory computer readable medium comprising program code, which when executed by a processor is configured to cause the processor to:
- receive a first trajectory information associated with a planned wellbore path;
- receive a second trajectory information associated with an actual path of a wellbore being drilled; and
- responsive to receiving the first trajectory information and the second trajectory information, generate a display on a display device of aa first portion of the planned wellbore path, (ii) a first portion of the actual path of the wellbore being drilled, and (iii) a plurality of regions with each of the plurality of regions being associated with a level of trajectory error based on a difference between the actual path of the wellbore being drilled and the planned wellbore path, wherein:
  - the plurality of regions displayed on the display device comprise a first region and a second region;
  - the first region comprises a first level of trajectory error;
  - the second region comprises a second level of trajectory error; and
  - the first level of trajectory error is lower than the second level of trajectory error.

21. The non-transitory computer readable medium of claim 20, wherein the program code, which when executed by a processor is configured to further cause the processor to:
- responsive to a user input via a video game controller, adjust the display in any one of three dimensions to provide an adjusted display corresponding to the user input.

22. The non-transitory computer readable medium of claim 20, wherein each of the plurality of regions comprises a rectangle or ellipsoid.

23. The non-transitory computer readable medium of claim 20, wherein the plurality of regions comprises at least three regions.

24. The non-transitory computer readable medium of claim 20, wherein each of the plurality of regions comprises a different color.

25. The non-transitory computer readable medium of claim 24, wherein the different color of each region is associated with the level of trajectory error.

26. The non-transitory computer readable medium of claim 20, wherein the display comprises a three-dimensional (3D) display.

* * * * *